US008965779B1

(12) United States Patent
Noble, Jr. et al.

(10) Patent No.: US 8,965,779 B1
(45) Date of Patent: *Feb. 24, 2015

(54) FULFILLING STAFFING REQUIREMENTS VIA AN INTERACTIVE VOICE RESPONSE SYSTEM

(71) Applicant: Noble Systems Corporation, Atlanta, GA (US)

(72) Inventors: James K. Noble, Jr., Marietta, GA (US); Jason P. Ouimette, Atlanta, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/556,671

(22) Filed: Dec. 1, 2014

Related U.S. Application Data

(63) Continuation of application No. 13/665,298, filed on Oct. 31, 2012.

(51) Int. Cl.
*G06Q 10/00* (2012.01)
(52) U.S. Cl.
USPC .................. 705/7.12; 705/7.14; 379/265.01
(58) Field of Classification Search
None
See application file for complete search history.

(56) References Cited

U.S. PATENT DOCUMENTS

| | | | | |
|---|---|---|---|---|
| 5,999,908 A * | 12/1999 | Abelow | | 705/7.32 |
| 6,275,812 B1 * | 8/2001 | Haq et al. | | 705/7.14 |
| 7,133,834 B1 * | 11/2006 | Abelow | | 705/7.32 |
| 7,155,399 B2 * | 12/2006 | Andre et al. | | 705/7.14 |
| 7,155,400 B1 * | 12/2006 | Jilk et al. | | 705/7.14 |
| 7,181,413 B2 * | 2/2007 | Hadden et al. | | 705/7.42 |
| 7,254,546 B1 * | 8/2007 | Andre et al. | | 705/7.14 |
| 7,620,565 B2 * | 11/2009 | Abelow | | 705/7.32 |
| 7,729,935 B2 * | 6/2010 | Theiler | | 705/7.27 |
| 7,769,617 B2 * | 8/2010 | Iwasaki et al. | | 705/7.26 |
| 7,805,382 B2 * | 9/2010 | Rosen et al. | | 705/321 |
| 7,937,281 B2 * | 5/2011 | Miller et al. | | 705/7.12 |
| 8,140,366 B2 * | 3/2012 | Adams et al. | | 705/7.12 |
| 8,200,527 B1 * | 6/2012 | Thompson et al. | | 705/7.39 |
| 8,788,375 B2 * | 7/2014 | Podgurny et al. | | 705/32 |
| 8,831,677 B2 * | 9/2014 | Villa-Real | | 455/552.1 |
| 2002/0040313 A1 * | 4/2002 | Hunter et al. | | 705/9 |

(Continued)

OTHER PUBLICATIONS

Gebert, Henning, et al. "Knowledge-enabled customer relationship management: integrating customer relationship management and knowledge management concepts [1]."*

(Continued)

*Primary Examiner* — Gurkanwaljit Singh

(57) ABSTRACT

Various embodiments of the invention provide methods, systems, and computer program products for fulfilling a portion of staffing requirements using an interactive voice response system ("IVR"). In particular embodiments, staffing requirements for a business activity are forecasted and a portion of the staffing requirements are identified that require fulfillment using the IVR. This portion of the staffing requirements includes one or more staff member positions required to be performed for the business activity. Eligible staff members that may fulfill the staff member positions are identified and a first member of the eligible staff members is contacted. Upon contacting the first member, the member is requested to fulfill a staff member position by the IVR and if the member accepts fulfilling the staff member position, an acceptance is sent from the IVR and the first member is scheduled based on his acceptance to fulfill the staff member position.

18 Claims, 10 Drawing Sheets

(56) References Cited

U.S. PATENT DOCUMENTS

| | | | |
|---|---|---|---|
| 2002/0077884 A1* | 6/2002 | Sketch | 705/12 |
| 2002/0156674 A1* | 10/2002 | Okamoto et al. | 705/11 |
| 2003/0139955 A1* | 7/2003 | Kirii et al. | 705/7 |
| 2003/0177027 A1* | 9/2003 | DiMarco | 705/1 |
| 2003/0233278 A1* | 12/2003 | Marshall | 705/14 |
| 2004/0117046 A1* | 6/2004 | Colle et al. | 700/99 |
| 2004/0133889 A1* | 7/2004 | Colle et al. | 718/100 |
| 2004/0138939 A1* | 7/2004 | Theiler | 705/8 |
| 2004/0158568 A1* | 8/2004 | Colle et al. | 707/100 |
| 2005/0119928 A1* | 6/2005 | Deitrich et al. | 705/9 |
| 2005/0119929 A1* | 6/2005 | Deitrich et al. | 705/9 |
| 2005/0159968 A1* | 7/2005 | Cozzolino | 705/1 |
| 2006/0229896 A1* | 10/2006 | Rosen et al. | 705/1 |
| 2007/0192157 A1* | 8/2007 | Gooch | 705/9 |
| 2008/0027783 A1* | 1/2008 | Hughes et al. | 705/9 |
| 2008/0201167 A1* | 8/2008 | Eggenberger-Wang et al. | 705/2 |
| 2008/0243581 A1* | 10/2008 | Jennings | 705/9 |
| 2009/0177518 A1* | 7/2009 | Adams et al. | 705/9 |
| 2009/0204470 A1* | 8/2009 | Weyl et al. | 705/9 |
| 2012/0029962 A1* | 2/2012 | Podgurny et al. | 705/7.13 |
| 2012/0089493 A1* | 4/2012 | Podgurny et al. | 705/32 |
| 2012/0179617 A1* | 7/2012 | Adams et al. | 705/321 |
| 2014/0162598 A1* | 6/2014 | Villa-Real, Antony-Euclid C. | 455/411 |

OTHER PUBLICATIONS

Bueren, Adrian, et al. "Customer knowledge management—improving performance of customer relationship management with knowledge management." 2013 46th Hawaii International Conference on System Sciences. vol. 7. IEEE Computer Society, 2004.*

Boateng, A. A. "The role of human resource information systems (HRIS) in strategic human resource management (SHRM)." Master of Science Theses, Accounting Swedish School of Economics and Business Administration, Palovartijantie (2007).*

Dilevko, Juris. "An ideological analysis of digital reference service models."Library trends 50.2 (2001): 218-244.*

Davoudi, Seyed Mehdi Mousavi, and Kiarash Fartash. "Electronic Human Resource Management: New Avenues which Leads to Organizational Success." Spectrum 1.2 (2012).*

Sharma, Megha. "Web Based Electronic-Human Resource Management System."*

Kashive, Neerja. "Managing Today's Workforce: Human Resource Information System (HRIS), its Challenge and Opportunities." International Journal of Research in Finance & Marketing 1.6 (2011): 38-66.*

Workforce Mobile Scheduler, Kronos, http://www.jhoe.com/media/bin/Workforce%20Mobile%20Scheduler%20for%20Healthcare.pdf, 2010.

Mobile Time and Attendance Tracking, Legiant, http://www.legiant.com/products/ivrtelephony.htm, 2007.

New IVR Module for Pipkins Vantage Point Software, http://www.pipkins.com/press/2003_2_ivr.asp, Feb. 10, 2003.

Workforce Management IVR, Syntellect, http://www.syntellect.com/SiteCollectionDocuments/Canada/WFM_Information.pdf, Aug. 27, 2010.

Webpage describing Telliris Product, www.telliris.com, May 20, 2010.

Gebert, Henning, et al. "Knowledge-enabled customer relationship management: intergrating customer relationship management and knowledge management concepts [1]," Journal of Knowledge Management, vol. 7 No. 5, 2003.

Bueren, Adrian, et al. "Customer knowledge management—improving performance of customer relationship management with knowledge management," 2013 46th Hawaii International Conference on System Sciences, vol. 7 IEEE Computer Society, 2004.

Boateng, A.A. "The role of human resource information systems (HRIS) in strategic human resource management (SHRM)," Master of Science Theses, Accounting Swedish School of Economics and Business Administration, Palovartijantie (2007).

Dilevko, Juris "An ideological analysis of digital reference service models," Library trends 50.2 (2001): 218-244.

Davoudi, Seyed Mehdi Mousavi, and Kiarash, Fartash "Electronic Human Resource Management: New Avenues which Leads to Organizational Success," Spectrum 1.2 (2012).

Sharma, Megha "Web Based Electronic-Human Resource Management System," International Journal of Innovative Studies, Vol. 3, Issue 7, Jul. 2014.

Kashive, Neerga "Managing Todays Workforce: Human Resource Information System (HRIS), its Challenge and Opportunities," International Journal of Research in Finance & Marketing 1.6 (2011): 38-66.

* cited by examiner

|  | 1st Hour | 2nd Hour | 3rd Hour | 4th Hour | 5th Hour | 6th Hour | 7th Hour | 8th Hour |
|---|---|---|---|---|---|---|---|---|
| Forecasted Calls | 123 | 110 | 112 | 147 | 156 | 135 | 137 | 140 |
| Actual Calls | 97 | 100 | 95 | 120 | 130 | 125 | | |
| Percent Difference | (21) | (9) | (15) | (18) | (17) | (7) | | |
| Forecasted AHT (Min.) | 3 | 3.5 | 3.75 | 3 | 3.5 | 4 | 3 | 3.2 |
| Actual AHT (Min.) | 4 | 4.25 | 4.1 | 4 | 3.75 | 4 | | |
| Percent Difference | 33 | 21 | 9 | 33 | 7 | 0 | | |
| Forecasted Staff | 4.92 | 5.13 | 5.60 | 5.88 | 7.28 | 7.20 | 5.48 | 5.97 |
| Scheduled Staff | 5 | 5 | 5 | 5 | 6 | 6 | 6 | 6 |
| Actual Staff | 5 | 5 | 5 | 5 | 6 | 5 | | |
| Percent Difference | 0 | 0 | 0 | 0 | 0 | (17) | | |

FIG. 6

FULFILLING STAFFING REQUIREMENTS VIA AN INTERACTIVE VOICE RESPONSE SYSTEM

CROSS-REFERENCE TO RELATED APPLICATION

The present application is a continuation of U.S. patent application Ser. No. 13/665,298 filed Oct. 31, 2012, and entitled "Fulfilling Staffing Requirements Via an Interactive Voice Response System" and is related to U.S. patent application Ser. No. 13/665,205 filed Oct. 31, 2012, and entitled "Addressing a Change to Staffing Requirements Via an Interactive Voice Response System," of which the contents of both are incorporated by reference in their entirety into the present application.

BACKGROUND

Scheduling a workforce for various business activities is a complex process that typically involves a large number of variables to consider in generating schedules such as, for example, volume of activities to be performed, available staff, and skills of various staff members with respect to performing these activities. Thus, many industries make use of some type of scheduling system to assist in generating and maintaining schedules for their workforces. In addition, in generating such schedules, scheduling systems may make use of forecasting techniques to better predict scheduling variables based on historical data for such variables.

However, a problem that can often occur is workforce needs (e.g., staffing requirements) may change during the course of business activities being conducted and these changes may result in labor shortages because the current work schedule becomes obsolete. For example, a particular organization may be providing cleaning services and several clients may suddenly request additional cleaning services for unforeseen reasons by the organization. Thus, the particular organization may not have enough of its workforce scheduled to staff the increased demand for its cleaning services. Furthermore, the organization may not have the mechanisms in place to quickly recognize this increased demand from several clients in a timely fashion and to adequately adjust the schedule by adding staff to meet the increased demand.

Thus, a need in the art exists for improved processes for timely recognizing changes in staffing requirements with respect to a workforce schedule and timely fulfilling these changes in staffing requirements so that the workforce schedule is still effective. In addition, a need in the art exists for implementing such processes that operate in an automated manner. It is with respect to these considerations and others that the disclosure herein is presented.

BRIEF SUMMARY

In general, embodiments of the present invention provide computer program products, methods, systems, apparatus, and computing entities for fulfilling a portion of staffing requirements using an interactive voice response system ("IVR"). In particular embodiments, staffing requirements for a business activity are forecasted and a portion of the staffing requirements are identified that require fulfillment using the IVR. For these particular embodiments, the portion of the staffing requirements includes one or more staff member positions required to be performed for the business activity.

Further, in these particular embodiments, a plurality of eligible staff members that may fulfill the one or more staff member positions are identified and a first member of the plurality of eligible staff members is contacted. Depending on the embodiment, a priority order for each member of the plurality of eligible staff members is set to establish the order in which the eligible staff members are contacted.

Upon contacting the first member, the member is requested by the IVR to fulfill at least one of the one or more staff member positions and a response as to whether the member accepts or denies fulfilling at least one of the one or more staff member positions is received. According to various embodiments, if the response indicates the first member accepts fulfilling at least one of the one or more staff member positions, an acceptance is sent from the IVR and the first member is scheduled based on the acceptance to fulfill at least one of the one or more staff member positions.

In particular embodiments, contacting the first member of the plurality of eligible staff members may comprise identifying contact information for the first member that includes a plurality of contact sources and attempting to contact the first member based on a first contact source from the plurality of contact sources. Upon failure to contact the first member based on the first contact source, the process for contacting the first member may further comprise contacting the first member based on a second contact source from the plurality of contact sources and so forth.

In addition, in particular embodiments, if the response indicates the first member denies fulfilling at least one of the one or more staff member positions, then a second member of the plurality of eligible staff members is contacted. In these particular embodiments, upon contacting the second member, similar to the first member, the second member is requested by the IVR to fulfill at least one of the one or more staff member positions and a second response is received from the second member indicating whether the second member accepts or denies fulfilling at least one of the one or more staff member positions. If the second response indicates the second member accepts fulfilling at least one of the one or more staff member positions, a second acceptance is sent from the IVR and the second member is scheduled to fulfill at least one of the one or more staff member positions.

In various embodiments, the business activity may be related to a number of different activities. For instance, in particular embodiments, the business activity comprises a call campaign at a call center. In these particular embodiments, the staffing requirements comprise agents employed by the call center needed to staff the call campaign and the plurality of eligible staff members comprise agents employed by the call center who are eligible to staff the one or more staff member positions for the portion of the staffing requirements.

For example, in some of these particular embodiments, the call campaign comprises an outbound call campaign and parameters for the campaign are defined that include: (1) a time period over which the outbound call campaign is to be carried out and (2) a target value identifying a number of an outbound communication result to occur over the time period. In addition, for these particular embodiments, a historical dataset may be selected that includes historical data on the corresponding outbound communication result for the outbound call campaign based on past outbound communications handled over a historical time period. Thus, for these embodiments, forecasting the staffing requirements is performed by generating an outbound forecast based on the historical dataset and the campaign parameters for the outbound call campaign in which the outbound forecast comprises a number of the outbound communication result forecasted to be achieved over the time period for the outbound call campaign in an attempt to meet the target value for the outbound call campaign.

Further embodiments of the present invention provide computer program products, methods, systems, apparatus, and computing entities for addressing changed staffing requirements by using an IVR. In these particular embodiments, initial staffing requirements for a business activity are identified that include one or more staff member positions required to be performed for the business activity and one or more staff members are scheduled to fulfill the one or more staff member positions.

In particular embodiments, upon a portion of the business activity being performed for a time period, a change to the initial staffing requirements for the business activity may be identified. Depending on the embodiment, this change may include at least one of an addition or a reduction to the initial staffing requirements based on a performance of the business activity for the time period.

In instances of an addition to the initial staffing requirements being identified, the addition includes one or more additional staff member positions required to be performed for a remainder of the business activity. For these particular instances, a plurality of first eligible staff members that may fulfill the one or more additional staff member positions is identified and a first member of the plurality of first eligible staff members is contacted. Upon contacting the first member, a request is made to the first member using an IVR to fulfill at least one of the one or more additional staff member positions. A response is received from the first member at the IVR indicating whether the first member accepts or denies fulfilling at least one of the one or more additional staff member positions and upon the response indicating the first member does accept, an acceptance pertaining to the first member is sent from the IVR and the first member is scheduled to fulfill at least one of the one or more additional staff member positions. In particular embodiments, upon the response indicating the first member does not accept, a second member of the plurality of first eligible staff members is contacted to inquire as to whether the second member is willing to fulfill at least one of the one or more additional staff members positions and so forth.

In instances of a reduction to the initial staffing requirements being identified, the reduction includes one or more staff member positions fulfilled for the initial staffing requirements that no longer need to be performed for a remainder of the business activity. For these particular instances, a plurality of second eligible staff members that includes staff members initially scheduled to fulfill the one or more staff member positions that no longer need to be performed for the remainder of the business activity is identified and a first member of the plurality of second eligible staff members is contacted. Upon contacting the first member, a request is made to the first member using the IVR as to whether the first member is willing to no longer fulfill at least one of the one or more staff member positions that no longer need to be performed. A response is received from the first member at the IVR indicating whether the first member is willing to no longer fulfill at least one of the one or more staff member positions that no longer need to be performed and upon the response indicating the first member is willing to no longer fulfill at least one of these positions, an acceptance pertaining to the first member is sent from the IVR and the first member is scheduled to no longer fulfill at least one of the one or more staff member positions that no longer need to be performed. In particular embodiments, upon the response indicating the first member is not willing to no longer fulfill at least one of the staff member positions, a second member of the plurality of second eligible staff members is contacted to inquire as to whether the second member is willing to no longer fulfill at least one of the one or more staff members positions that no longer need to be performed and so forth.

In instances in which the business activity is an outbound contact campaign, for particular embodiments, the initial staffing requirements may be identified by generating an outbound forecast based on a historical dataset and campaign parameters for the outbound contact campaign. For these particular embodiments, the outbound forecast may comprise a number of an outbound communication result forecasted to be achieved over a time period for the outbound contact campaign in an attempt to meet a target value for the outbound contact campaign and the initial staffing requirements needed to achieve the number of the outbound communication result forecasted.

Likewise, in instances in which the business activity is an outbound contact campaign, for particular embodiments, the change to the initial staffing requirements is identified by supplementing a historical dataset to include performance data collected on a portion of the outbound contact campaign performed for a time period and generating a revised outbound forecast based on the supplemented historical dataset and campaign parameters for the outbound contact campaign. For these particular embodiments, the revised outbound forecast may comprise a revised number of an outbound communication result forecasted to be achieved over a time period for the outbound contact campaign in an attempt to meet a target value for the outbound contact campaign and the change in initial staffing requirements needed to achieve the revised number of the outbound communication result forecasted.

As is discussed in greater detail below, the subject matter disclosed herein may be implemented as a computer-controlled apparatus, a method, a computing system, or as an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale, and wherein:

FIG. 6 is a table providing actual performance information and planned performance information for eight one-hour time intervals for a particular shift for an outbound campaign.

DETAILED DESCRIPTION

Figure 1:
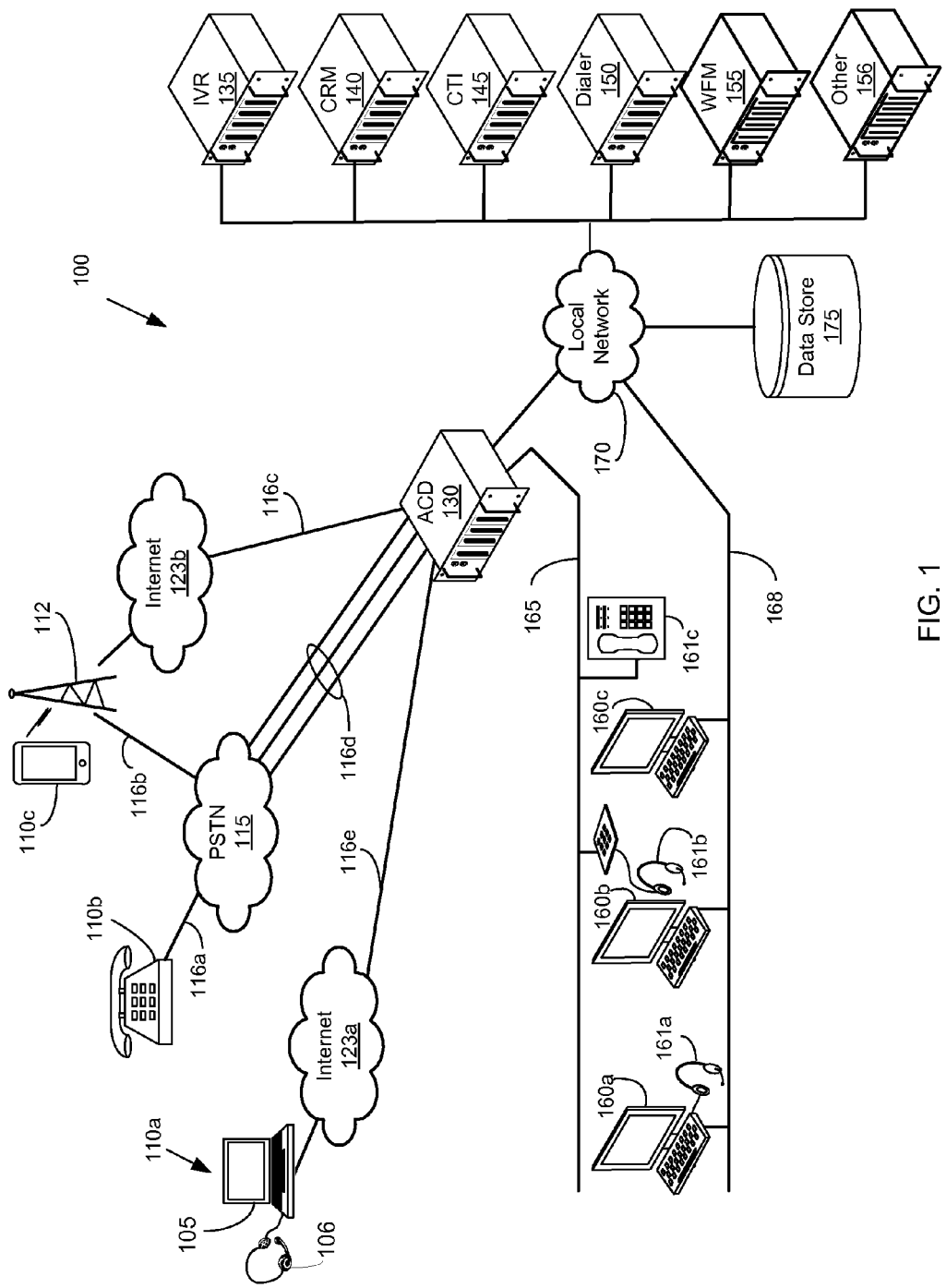
FIG. 1 shows one embodiment of a call center architecture illustrating the various technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Scheduling Systems

Many industries make use of scheduling systems (e.g., software and/or hardware) to aid in scheduling their workforce. For instance, in the retail industry, a retailer may have a number of employees that work various "shifts" during the retailer's store hours. For example, the retailer's store may be opened daily from 9:00 a.m. to 9:00 p.m. During this time, on any given day, the retailer may have some salespersons working from 9:00 a.m. to 3:00 p.m., some salespersons working from 1:00 p.m. to 9:00 p.m., and some salespersons working 10:00 a.m. to 6:00 p.m. These shifts may vary from week-to-week and/or from day-to-day. For example, for a following day, the retailer may have some salespersons working from 9:00 a.m. to 2:00 p.m., some salespersons working 1:00 p.m. to 7:00 p.m., and some salespersons working 3:00 p.m. to 9:00 p.m. Thus, due to the variation in shifts, the retailer may make use of a scheduling system to aid in appropriately staffing the store.

In other industries, such as construction or health, the scheduling of the workforce may be even more complicated because not only does the scheduling of the workforce involve varying shifts but may also involve varying duties and/or jobs. For example, for a hospital, scheduling the workforce may involve scheduling doctors, nurses, and other support staff such as cleaning persons. In construction, scheduling the workforce may involve scheduling carpenters, electricians, plumbers, etc. Further, scheduling the workforce may entail having the right types of staff available during the right times. For example, a construction company will want to schedule electricians for a work site on the days the electricians are needed and not at other times when they are not, such as, for example, when the site is being leveled so that the foundation can be poured. Thus, many industries make use of scheduling systems to handle all of these different variables that would otherwise be difficult to manage manually.

Further, in many instances, scheduling systems may make use of forecasting capabilities to better schedule the workforce for a particular industry. These scheduling capabilities typically involve some type of predictive modeling that helps to predict staff needs so that the staff can be scheduled accordingly. For instance, many industries experience varying demand on their services and/or products during the course of a work week and/or day. For example, an emergency room at a hospital may historically have a higher patient intake during Saturday nights with respect to other nights during the week in the summer months. Thus, the scheduling system used to schedule the hospital's emergency room may use forecasting capabilities to identify this trend and to predict the increased need for staff during Saturday nights in the summer months. As a result, the scheduling system may schedule additional staff during these Saturday nights.

Another example of such an industry is contact centers. Scheduling agents at contact centers is a complex process that typically involves a large number of variables to consider in generating schedules such as, for example, volume of communications to be handled (e.g., number of inbound communications typically received over a time period and/or number of outbound communications to be made over the time period), available staff, skills of various staff members (e.g., agents), reasons for communications (e.g., customer service, order taking, and/or sales), and number of communication sources (e.g., inbound call queues, outbound call queues, emails, and/or web chats). Thus, forecasting techniques are typically employed in scheduling contact centers to better predict scheduling variables based on historical data for such variables.

With the above in mind, it is noted that the various inventive aspects described herein can be applied to scheduling a number different industries, such as those briefly discussed above for example. However, for purposes of describing the invention and for simplicity, the remainder of the application will focus on describing the invention in the context of scheduling agents in a contact center (e.g., call center). Accordingly, describing the invention in this context should not be construed to limit the scope of the invention. That is, as one of ordinary skill in the art will appreciate from reading this disclosure, the inventive aspects described herein can be applied to many different industries and not just the contact center industry.

Exemplary Call Center Architecture

FIG. 1 shows one embodiment of a call center architecture 100 illustrating the various technologies disclosed herein. The call center shown in FIG. 1 may process voice calls that are inbound-only, outbound-only, or a combination of both (sometimes referred to as a "blended" call center). Although many aspects of call center operation are disclosed in the context of voice calls, in various embodiments, the call center may process other forms of communication such as, for example, facsimiles, emails, text messages, video calls, and chat messages. That is, the call center may be considered a contact center. However, for the purposes of this disclosure, the term "call center" is used throughout, although it is understood that the two are synonymous.

Since the call center may handle calls originating from a calling party, or initiated to a called party, the term "party," without any further qualification, refers to a person associated with a call processed by the call center, where the call is either received from or placed to the party. The term "caller," if used, will generally refer to a party communicating with the call center, but in many cases this usage is exemplary. Thus, use of the term "caller" is not intended to limit the concepts to only inbound calls or voice calls, unless the context dictates such.

Depending on the embodiment, inbound voice calls may originate from calling parties using a variety of different phone types. For instance, a calling party may originate a call from a conventional analog telephone 110b connected to a public switched telephone network ("PSTN") 115 using an analog plain old telephone service ("POTS") line 116a. The calls may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a smart phone device 110c, such as a smart phone, tablet, or other smart device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123b using Internet-based protocols. For convenience, unless indicated otherwise, the term "trunk" refers to any type of facility 116c, 116d, or 116e providing voice calls to, or from, the call center, regardless of the type of protocol or technology used. Specifically, a "trunk" is not limited to time-division multiplexing ("TDM") technology.

Inbound voice calls may also originate from a calling party employing a so-called "IP phone," "VoIP phone," or "soft phone" 110a. In one embodiment, this device may comprise a computing device 105, such as a laptop, computing tablet, or other electronic device, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123a, such as a cable company providing Internet access services over a coaxial cable facility 116e. Those skilled in the art will recognize that a variety of protocols and facilities may be used to convey voice calls.

The term "telephone call" as used herein is generally synonymous with a "voice call" unless indicated otherwise. Further, the term "telephone call" may encompass a voice call originating from any type of device, such as a soft phone 110a, conventional telephone, 110b, a smart phone 110c, or other device known in the art. The term "call" as used herein may mean an active instance of two-way communication, an attempt to establish two-way communication, or a portion of the two-way communication. For example, a user at a conventional telephone 110b can dial a telephone call in an attempt to establish two-way communication, and a call can be said to exist even prior to establishment of a two-way connection. In another example, a call may be put on hold, and a portion of the call may be referred to as a "call leg" existing between the caller and certain equipment. A call may comprise a number of concatenated call legs, as known to those skilled in the art. In certain contexts, which will be made explicit, the call may encompass communications other than voice, for example, text, email, video chat, facsimile, etc.

In various embodiments, inbound calls from callers to the call center may be received at an automatic call distributor ("ACD") 130. In particular embodiments, the ACD 130 may be a specialized switch for receiving and routing inbound calls under various conditions. Further, the ACD 130 may be embodied as a dedicated form of equipment readily available from various manufacturers, or the ACD 130 may be a so-called "soft switch" comprising a suitable programming module executed by a processing device to perform the necessary functions. The ACD 130 may route an incoming call over call center facilities 165 to an available agent. Depending on the embodiment, the facilities 165 may be any suitable technology for conveying the call, including but not limited to a local area network ("LAN"), wide area network ("WAN"), ISDN, or conventional TDM circuits. In addition, the facilities 165 may be the same or different from the facilities used to transport the call to the ACD 130.

In various embodiments, calls may be routed over facilities 165 to an agent for servicing. That is, for example, the party may speak with an agent to receive customer service. The physical area at which the agent sits is often referred to as an agent "position" and these positions are often grouped into clusters managed by a supervisor, who may monitor calls and the agents' productivity. An agent typically uses a computing device 160a-160c, such as a computer, and a voice device 161a-161c. The combination of computing device 160a-160c and voice device 161a-161c may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to one of the voice devices 161a-161c at the agent's position. Similarly, "routing the call to the agent" means routing a call to the appropriate equipment at an agent's position.

In particular embodiments, the voice device 161a-161c used by an agent may be a soft phone device exemplified by a headset 161a connected to the computer 160a. The soft phone device may be a virtual telephone implemented in part by an application program executing on the computer 160a. Further, the phone may also comprise an Internet Protocol ("IP") based headset 161b or a conventional phone 161c. Use of the term "phone" is intended to encompass all these types of voice devices used by an agent, unless indicated otherwise.

Agents typically log onto their workstations prior to handling calls. This allows the call center to know which agents are available for handling calls. In particular embodiments, the ACD 130 may also maintain data of an agent's skill level that may be used to route a specific call to the agent or group of agents having the same skill level. In particular instances, if a suitable agent is not available to handle a call, the ACD 130 may queue the call for the next available agent. As can be expected, various algorithms may be employed to process calls in an efficient manner.

In various embodiments, two types of signaling information may be provided with an inbound call that may be used by the ACD 130 in processing the call. The first type of signaling information indicates the telephone number dialed by the caller, and is frequently referred to as "DNIS," derived from the Dialed Number Identification Service associated with this capability. For example, in particular instances, a call center may provide various services, such as sales, customer service, technical support, etc., each of which may be associated with a different telephone number (e.g., multiple toll free "800" numbers). In these instances, the ACD 130 may use the DNIS to determine the purpose of the call, and potentially identify a group of agents having the appropriate skill level to handle the call. Thus, in various embodiments, the ACD 130 may prioritize and route calls to an agent based on the required skill level. Skills-based routing may be a rule-based set of instructions that the ACD 130 uses to handle calls. Depending on the embodiment, skills-based routing may be implemented by the ACD 130, or by the ACD 130 interacting with a computer-telephone integrated ("CTI") server 145.

In various embodiments, the CTI server 145 may be incorporated in the call center architecture 100 to control, monitor, and/or coordinate other components of the architecture 100. Specifically, the CTI server 145 may interact with the ACD 130 to coordinate call processing. Thus, in particular embodiments, the CTI server 145 may control routing of calls from the ACD 130 to the various agent workstations and/or may provide data to other components processing the calls. In addition, in particular embodiments, the CTI server 145 may also monitor various components of the architecture 100. For example, the CTI server 145 may monitor the number of calls received and/or made by the call center and/or monitor performance parameters of agents such as the average handling time of calls for individual agents. Further, the CTI server 145 may also provide call reporting functionality based on data collected during calls.

The second type of signaling information that may be provided with an inbound call is the calling telephone number, often referred to as automatic number identification or "ANI." In particular embodiments, the ACD 130 and/or CTI server 145 may use the ANI of an incoming call to retrieve caller information from a data store 175 and provide the data to an agent's workstation computer 160a-160c over facilities 168 along with routing the call to the agent's workstation phone 161a-161c. Further, in particular embodiments, the ANI may also be used to ascertain a party's status (e.g., a "Gold Level" customer warranting premium service) and/or to facilitate the ACD 130 routing the call to a select group of agents. Depending on the embodiment, the data store 175 may include one or more databases storing different information such as, for example, records of caller information. Further, the data store 175 may be integrated with the CTI server 145, the ACD 130, or segregated as a standalone medium or media.

In various embodiments, the ACD 130 may place a call in a queue if there are no suitable agents available, and/or it may route the call to an interactive voice response system (e.g., server) ("IVR") 135 to play voice prompts. In particular embodiments, these prompts may be in a menu type structure and the IVR 135 may collect and analyze responses from the party in the form of dual-tone multiple frequency ("DMTF") tones and/or speech. In addition, the IVR 135 may be used to further identify the purpose of the call, such as, for example, prompting the party to enter account information or otherwise obtain information used to service the call. Further, in particular embodiments, the IVR 135 may interact with other components, such as the CTI server 145 or the data store 175, to retrieve or provide information for processing the call. In other configurations, the IVR 135 may be used to only provide announcements.

Yet further, in particular embodiments, the IVR 135 may be configured to interact with parties contacted from outbound communications (such as communications placed by the call center to call center employees) in addition to or instead of handling communications received by the call center. For example, as is described in greater detail below, in particular embodiments, a component of the call center (such as a dialer 150 for example) may place communications to individual agents and the IVR 135 may interact with these individual agents once they are contacted to inquire as to whether the agents will fulfill a particular shift recently added to a schedule for the call center. Depending on the embodiment, the call center may make use of one IVR 135 configured to handle only inbound communications and/or one IVR 135 configured to only handle outbound communications or a single IVR 135 to handle both types of communications.

Depending on the embodiment, the interaction between the ACD 130, IVR 135, CTI server 145, agent computers 160a-160c, as well as other components, may involve using a local area network ("LAN") 170. However, other configurations are possible, such as, but not limited to, using a wide area network, wireless network, router, bridge, direct point-to-point links, etc.

In particular embodiments, when an agent is interacting with a called or calling party, the agent may use his workstation computer to further interact with other enterprise computing systems, such as, for example, a customer relationship management ("CRM") server 140. A CRM server 140 may be used to integrate information from various enterprise business systems to facilitate the agent servicing the call. In addition, the CRM server 140 may provide a variety of applications.

In addition to receiving inbound communications, including, for example, voice calls, emails, text messages, and facsimiles, the call center may also originate communications to a called party, referred to herein as "outbound" communications. In some embodiments, a call center may employ a dialer 150, such as a predictive dialer, to originate outbound calls at a rate designed to meet various criteria. Similar to the other components within the call center architecture 100, depending on the embodiment, the dialer 150 may comprise one or more software modules executing on a processing device hardware platform.

In various embodiments, the dialer 150 is typically configured to dial a list of telephone numbers to initiate outbound calls, which can be accomplished by instructing the ACD 130 to originate the calls. Thus, in some embodiments, the ACD 130 may include functionality for originating calls, and if so, this functionality may be referred to as a private automatic branch exchange ("PBX" or "PABX"). In other embodiments (not shown), the dialer 150 may directly interface with voice trunks using facilities 116c, 116d, 116e to the PSTN 115 and/or Internet providers 123a, 123b for originating calls. After the calls are originated, a transfer operation by the ACD 130 (or dialer 150) may connect the call with an agent or a queue, or in instances with respect to this invention, an IVR 135. In instances in which the call is placed in a queue, announcements or music may be provided to the party. In various embodiments, the dialer 150 may make use of one or more algorithms to determine how and when to dial a list of numbers so as to minimize the likelihood of a called party being placed in a queue while maintaining target agent utilization.

Another server that is employed in the call center architecture 100 shown in FIG. 1 is a workforce management system ("WFM") 155. As is discussed in further detail below, in various embodiments, this WFM 155 maintains information and generates agents' schedules to effectively handle inbound/outbound communications. For instance, in particular embodiments, the WFM 155 maintains historical call volume information for call campaigns and generates forecasts for expected call volume based on the historical information to predict the number of agents needed to handle the call volume at a defined service level. The WFM 155 then applies the forecasts and information about available agents to generate work rosters of agents (e.g., schedules). That is, the WFM 155 schedules agents for work shifts according to the anticipated needs of the call campaigns.

Finally, in various embodiments, the call center architecture 100 may include one or more other processing devices 156 to perform various functions. For example, in one particular embodiment, the call center architecture 100 includes a processing device 156 to serve as a quality assurance system that records communications fielded by agents and/or allows managers to monitor communications to ensure these communications are being handled correctly.

Although the above components are referred to as a "server," each may be also referred to in the art as a "computing device," "unit" or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the ACD 130, IVR 135, CRM server 140, CTI server 145, dialer 150, WFM 155, or other component may be combined into a single hardware platform executing one or more software modules. In addition, the call center architecture 100 may be provided as a hosted solution, where the call processing functionality is provided as a communication service (a so-called "communication-as-a-service" or "CaaS") to a call center operator. Thus, there is no requirement that the servers identified above actually be located or controlled by a call center operator.

In addition, depending on the embodiment, the agent positions may be co-located in a single physical call center or multiple physical call centers. The agents may be remotely located from the other components of the call center, and may also be remotely located from each other, sometimes referred to as a "virtual call center." In particular instances, a virtual call center may describe a scenario in which agents work at home, using their own computers and telephones as workstations. In some configurations, a single physical location of the call center may not be readily identifiable. For instance, this may occur when the call processing functions are provided as a service in a hosted cloud computing environment and the agents positions are in their individual residences.

Those skilled in art will recognize FIG. 1 represents one possible configuration of a call center architecture 100, and that variations are possible with respect to the protocols, facilities, components, technologies, and equipment used. For example, various algorithms and queuing arrangements may be defined to efficiently process and/or place calls.

General Overview of Process

Figure 2:
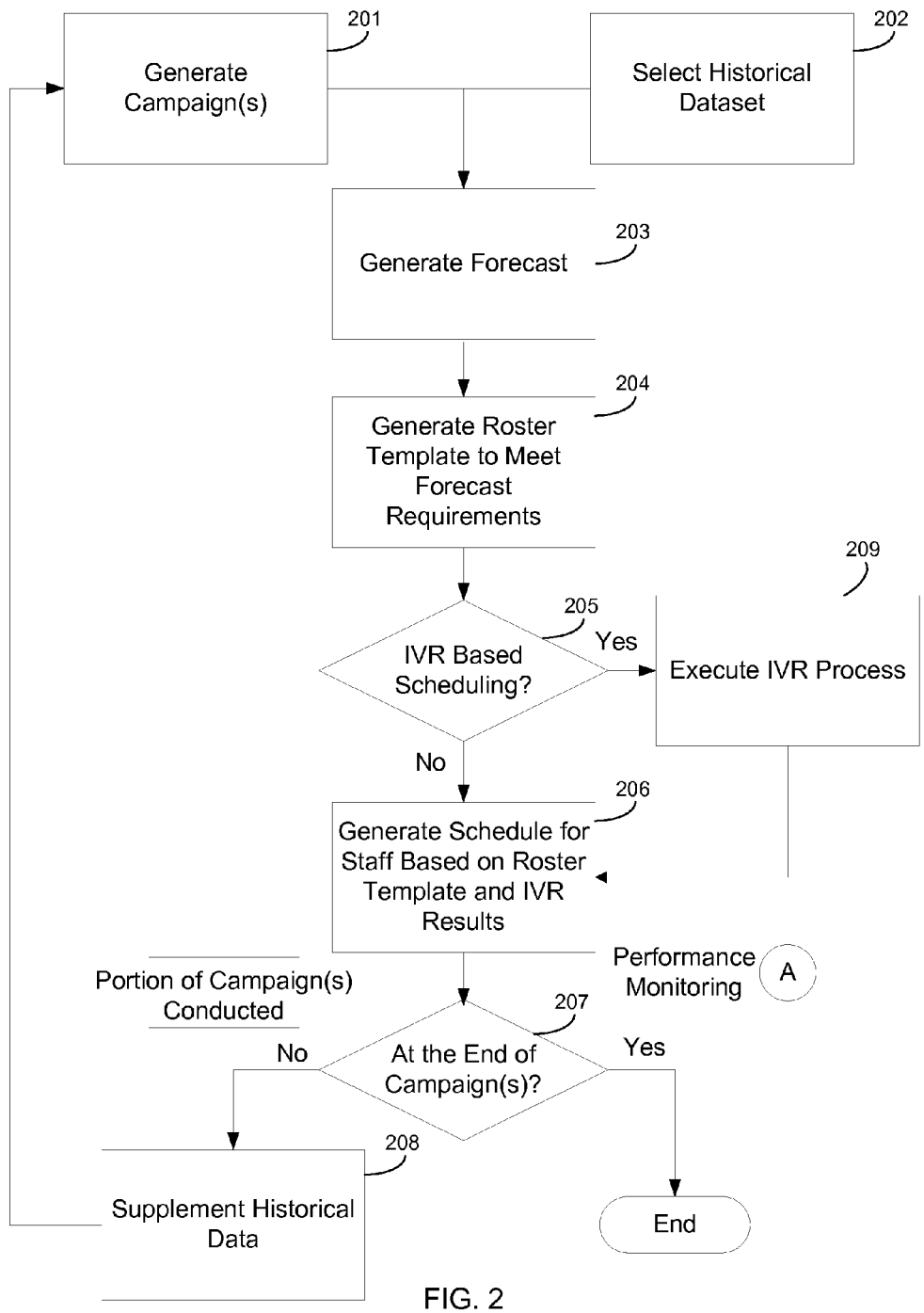
FIG. 2 is a flowchart illustrating a process for fulfilling staffing requirements using an IVR according to various embodiments of the present invention.

FIG. 2 provides an overview of a process for fulfilling staffing requirements via an IVR according to various embodiments of the invention. At a high level, the staff fulfillment process involves generating/defining or selecting one or more call campaigns, along with historical data, that are then used to generate a forecast. The forecast, in turn, is used to generate a roster template of shifts. The roster template is then used to generate the schedule, which identifies the particular staff to fulfill the shifts. As discussed in further detail below, at various points during this process, one or more of the shifts identified by the roster template are staffed with particular agents by making use of an IVR. That is, in various embodiments, one or more of the shifts are fulfilled by particular agents by contacting these agents, receiving their confirmation to schedule them for the shifts by making use of an IVR, and scheduling the agents accordingly by the scheduling system (e.g., WFM 155). For purposes of illustration, a user of the scheduling system (e.g., WFM 155) may be a call center administrator.

The process typically begins with generating or selecting one or more campaigns, shown as Step 201. These campaigns may be outbound, inbound, or combination thereof. However, for simplicity, the selected campaigns comprise one or more outbound campaigns in this instance. For purposes of this disclosure, an "outbound campaign" is understood to be a series of communications to be placed to various parties in accordance with various parameters, which may include defined goals (e.g., objectives). For example, a business may conduct an outbound campaign to call, text, and/or email local residents to inform them of a new store location opening in the residents' area. Typically an outbound campaign is defined by parameters such as, for example, the time period over which the campaign will be conducted (e.g., a start date and an end date), a "call" list providing the parties to be contacted and the appropriate information to contact them (e.g., telephone numbers and/or email addresses), and/or the skills needed by those handling the communications (e.g., skills needed by the agents calling the parties on the list).

Further, other parameters associated with the outbound campaign may identify one or more goals or objectives to be achieved by the campaign. For example, a goal may specify a total number of communications that need to be made during the campaign or during a particular time interval of the campaign (e.g., dials), a number of the communications that need to be answered (e.g., connects), a number of the communications answered that need to reach the right party (e.g., right party connects or RPC), or a number of the RPC that need to result in a targeted activity being completed, such as, for example, completing a sale to the party (e.g., completes). Thus, generating the one or more campaigns generally involves defining the various parameters for the campaigns.

For example, a call center may be contracted to conduct a first outbound campaign that involves placing a number of outbound phone calls to a list of three thousand past donors for a particular charity. The first outbound campaign is to take place over the first week of June and the goal for this particular campaign is to solicit donations from at least eight hundred of the past donors reached on the phone. In addition, the same call center may be contracted to conduct a second outbound campaign that involves placing a number of outbound phone calls to a list of four thousand homeowners in a particular area to inform them about a new refinancing program being offered by a bank in the area. The second outbound campaign is to take place over the first two weeks of June and the goal for this particular campaign is to reach one thousand of the parties intended to be called. In this instance, portions of the time periods over which the two campaigns are to take place overlap with one another. That is, portions of the two campaigns are to be conducted concurrently. Therefore, the call center may utilize its staff to conduct these portions of the two outbound campaigns at the same time.

For this particular situation, a single forecast is generated for the two campaigns to predict the likelihood of each campaign meeting its goals over the first two weeks of June. Such an approach may be taken to evaluate what effect conducting the two campaigns will have on each other with respect to the parameters and/or goals defined for each of the outbound call campaigns. Such an approach may provide an advantage over conducting a separate forecast for each outbound call campaign because in instances in which a separate forecast is conducted for each outbound call campaign, each forecast would be performed in isolation without consideration of the second call campaign's parameters and/or goals.

Returning to FIG. 2, in order to generate the forecast, one or more sets of historical data are selected, shown as Step 202. Typically, the selected historical dataset includes historical data for similar types of outbound campaigns as those for which the forecast is being conducted for. For example, in the case of the two campaigns described above, the historical dataset may include data on a past outbound campaign conducted to solicit donations for the same charity or similar charity and a past outbound campaign conducted to contact homeowners in the area or an area with similar residences.

Once the campaigns have been generated and the historical data has been selected, the process continues with generating a forecast for the campaigns based on the historical data. In general, the purpose of generating the forecast is to provide an accurate prediction of the resources needed to achieve the defined goal(s) for the one or more outbound campaigns. Thus, the forecast involves analyzing historical data on similar types of communications to predict outcomes of the communications that will be conducted during the one or more outbound campaigns. Thus, in Step 203, the forecast is generated for the one or more selected campaigns and a prediction of the likelihood of meeting the goals defined for the campaigns is provided. For instance, returning to the example, the forecast may predict for the first campaign that six hundred and eighty-two of the past donors reached during the first week of June are expected to give donations. In addition, the forecast may predict that although the call list for the first campaign comprises three thousand past donors, only two thousand five hundred of the past donors can be called over the first week of June. Further, the forecast may predict for the second campaign that one thousand homeowners are expected to be reached over the first twelve days of June by placing three thousand calls to homeowners on the list.

In particular embodiments, predictions may be based on limitations associated with the call center. For instance, in the example, parameters for the call center may be defined that indicate a maximum number of agents available for any given time interval (e.g., a work day) during the period in which the two campaigns are to be conducted is fifty agents. In addition, a parameter may be defined that indicates the second campaign should be given priority over the first campaign. That is, the call center is to conduct the two campaigns so that meeting the goal of the second campaign is given priority over meeting the goal for the first campaign. Therefore, based on these parameters and call statistics, such as the average handle time (AHT) determined for a call answered by a caller for each campaign, the forecast may predict that only a certain number of calls (e.g., two thousand five hundred) can be made over the entire week for the first campaign.

At this point in various embodiments, if one or more predictions are unsatisfactory, the forecast may be regenerated using a different/revised set of historical data and/or different/revised campaigns. For instance, returning to the example, the parameters for the first campaign to solicit donations may be revised to indicate that the campaign will now run for the first ten days of the month of June instead of the first week of June. The forecast may then be regenerated based on the revised parameters for the first campaign. The forecast may predict that the first campaign will meet its goal of soliciting eight hundred donations from past donors reached during the first ten days of June. Further, the prediction may indicate that a total of two thousand eight hundred and fifty of the past donors will need to be called to reach the eight hundred donations goal for the first campaign. Thus, a number of forecasts may be generated using revised information until a satisfactory prediction is obtained.

Once a forecast indicating an acceptable set of predictions is produced, a roster template is generated to meet the predictions for the one or more campaigns, shown as Step 204. For purposes of this disclosure, a "roster template" is understood to be a group of shifts based upon a forecast associated with campaigns, where the shifts represent an attempt to meet the campaign goals.

In this instance, a "shift" is a unit used in planning, allocating, and/or assigning work to staff. In various contexts, a shift may be further characterized by one or more different attributes, such as, for example: a certain type (e.g., outbound call shift, first campaign shift, or a second campaign shift); a time period (e.g., the 8:30 a.m. to 5:30 p.m. shift, evening shift, or graveyard shift); or particular staff members (e.g., John Doe's shift, outbound call agents' shift, or daytime employees' shift). Thus, as demonstrated in these examples, a shift may be associated with an individual (e.g., John Doe's shift) or with a plurality of individuals (e.g., staff members assigned to the evening shift). Thus, the roster template generation process involves identifying a set of shifts to meet the forecast requirements of the one or more campaigns. These shifts may be overlapping, serial relative to one another, or a combination of both. In the last case, a number of shifts may be in parallel to each other during a day and then serial relative to each other over a number of days.

Returning to the example, this step involves defining a set of shifts so that two thousand eight hundred and fifty calls can be made over ten days to past donors and three thousand calls can be made over twelve days to homeowners in order to reach the goals for the two campaigns. The set of shifts may comprise a number of different combinations of shifts to meet the forecast requirements depending on the embodiment. For instance, the set of shifts may include twenty-four shifts from eight o'clock a.m. to three o'clock p.m. for ten of the twelve days and twenty-five shifts from three o'clock p.m. to eleven o'clock p.m. for all twelve days. Some shifts may involve handling calls for the first campaign or the second campaign while other shifts may involve handling calls for both campaigns.

At this point, depending on the embodiment, the roster template may be edited by the call center administrator to modify or define parameters for the shifts and/or to fine-tune the roster template. For example, the shifts may be edited to include a thirty minute break for lunch. In particular instances, the roster template may be regenerated to take into consideration any such edits to the roster template. That is, in the example, the roster template may be regenerated to take into consideration the added thirty minute breaks for lunch. As a result, the roster template may now include twenty-four shifts from eight o'clock a.m. to four o'clock p.m. for ten of the twelve days and twenty-five shifts from two o'clock p.m. to eleven o'clock p.m. for all twelve days in order to meet the forecast requirements. Once the roster template has been generated as desired, the template is saved.

After a roster template has been generated based on the one or more campaigns and forecast, a schedule is generated based on the staff of the call center. "Staff" refers to one or more human resources (typically employees of the call center) that can be allocated work. In particular instances, the staff can be characterized as having one or more common attributes. For example, a particular call center may have multiple locations and a staff is considered the employees that work at a particular location, or both locations. Further, a staff may comprise employees of a particular type and/or skill set. For example, one call center may consider its employees to make up a first staff of agents and a second staff of supervisors and managers. In another example, a call center may consider its employees trained to handle outbound sales calls as a first staff and its employees trained to handle outbound donation solicitation calls as a second staff. One of ordinary skill in the art can envision numerous attributes that may be used to define a staff in light of this disclosure. Thus, returning to the example, in general, the call center staff is used and applied to the roster template to generate a schedule to conduct the two campaigns.

With that said, in various embodiments of the invention, the process also involves identifying one or more shifts that may need to be fulfilled by making use of an IVR 135. Thus, in these particular embodiments, the WFM 155 for the call center evaluates the shifts identified by the roster template and determines whether any of the shifts may need to be fulfilled by making use of the IVR 135, shown as Step 205.

For instance, returning to the example, the two outbound campaigns are to begin the first week of June and the roster template may have been generated on May 31$^{st}$ indicating shifts for June 1$^{st}$. Since June 1$^{st}$ is the next day, the WFM 155 may recognize that fulfilling the shifts for June 1$^{st}$ is not feasible under the "normal" scheduling process. That is, the WFM 155 may recognize that using the normal scheduling process of scheduling agents for the shifts on June 1$^{st}$ and posting the schedule for agents to view may not be feasible because such a process will not alert the agents scheduled to work June 1$^{st}$ in time. Therefore, the WFM 155 may identify these shifts as needing to be fulfilled by making use of the IVR 135.

Thus, if the WFM 155 identifies shifts that need to be scheduled by making use of the IVR 135, the IVR process is executed in Step 209. As is further detailed below, the IVR process involves the IVR 135 (or component such as a dialer 150) receiving information on the shifts that need to be filled and information on the agents eligible to fulfill these shifts. That is, for instance, in various embodiments, once the WFM 155 identifies the shifts that need to be scheduled by making use of the IVR 135, the WFM 155 also identifies the agents that may fulfill these shifts. (In alternative embodiments, the IVR 135 may perform this function instead of the WFM 155.)

For instance, the WFM 155 evaluates the roster of agents at the call center and determines which agents may be eligible to work the shifts on June 1$^{st}$. The WFM 155 may make this determination based on a number of different parameters according to various embodiments. For example, the WFM 155 may make this determination based on the hours an agent has worked over the previous week, whether the agent is scheduled for vacation on June 1$^{st}$, whether the agent's skill set meet the skills required for the shifts on June 1$^{st}$, and/or whether the agent will qualify for overtime by working a shift on June 1$^{st}$. One of ordinary skill in the art can envision numerous parameters the WFM 155 may use in light of this disclosure. Further, depending on the embodiment, the information provided by the WFM 155 to the IVR 135 on the eligible agents may also identify a priority order in which the agents are to be contacted.

Thus, in various embodiments, the IVR 135, working in concert with one or more other components of the call center, contacts the eligible agents to inquire as to whether the agents would like to work the shifts on June 1$^{st}$. For example, in particular embodiments, the IVR 135 works in concert with a dialer 150. For these particular embodiments, the dialer 150 may place a call to a particular agent and upon the agent answering the call, the dialer 150 may forward the call with the agent to the IVR 135 to handle. However, in other embodiments, the IVR 135 may be a self-supporting system in which the IVR 135, itself, places the communications to the agents.

Depending on the embodiment, the information for an eligible agent may include one or more contacts that the IVR 135 may used to attempt to contact the agent. For example, a particular agent's contact may include a home telephone number and a cellular telephone number. Further, depending on the embodiment, the IVR 135 (and/or corresponding component) may be configured to use different modes of communication such as, for example, telephone calls, text messages, Webs chats, or any combination thereof.

Thus, returning to the example, when a particular agent is contacted, the IVR 135 inquires whether the agent would like to work an available shift on June 1$^{st}$. For instance, a phone call may be placed to the agent and the agent answers. At this point, the IVR 135 may play a digital voice message to the agent offering him the option of working a shift on June 1$^{st}$. In turn, the IVR 135 may receive a response from the agent indicating whether or not he accepts the shift by the agent either verbally accepting or denying the shift (e.g., speech recognition) or by the agent selecting a particular key on the agent's telephone device (e.g., DTMF input). The IVR 135 records the agent's response and disconnects with the agent. At this point, if the agent has accepted the shift, the IVR 135 may move to the next shift or staff member position of the shift needed fulfilling and the next eligible agent. With respect to this disclosure, a "staff member position" is understood to be a particular position a staff member may hold for a particular time period (e.g., a shift, a week, an entire campaign). For example, a first staff member position for a particular shift may be an outbound agent and a second staff member position for the same shift may be a supervisor. Thus, depending on the instance, several staff member positions may be available for any particular time period. If the agent had declined the shift, the IVR 135 may move to the next eligible agent for the particular shift. The IVR 135 continues this process until all of the shifts are fulfilled or until the IVR 135 runs out of eligible agents.

At this point, the IVR 135 reports the results of fulfilling the shifts to the WFM 155 and the WFM 155 uses the results indicated by the IVR 135 to generate the schedule for the roster template in Step 206. That is, in various embodiments, the WFM 155 generates a schedule by identifying specific members of the staff (e.g., agents) who are assigned to work the shifts (e.g., staff member positions of the shifts) identified for the roster template. In this instance, some of these staff members have been established by utilizing the IVR process (e.g., the shifts on June 1$^{st}$). For the remainder of the shifts for the roster template, the WFM 155 uses its normal scheduling process to fill these shifts with staff members. As a result, the schedule for the example identifies specific agents assigned to work the twenty-four shifts from eight o'clock a.m. to four o'clock p.m. for the first ten days of June and the twenty-five shifts from two o'clock p.m. to eleven o'clock p.m. for twelve days of the first two weeks of June.

At this point, during execution of the campaigns, performance monitoring may occur in particular embodiments that may identify changes in staffing requirements. Such monitoring is typically conducted to attempt to identify short-term changes in staffing requirements so that such changes may be addressed by adding or reducing staff members. For instance, in particular embodiments, the forecasting results for a campaign may include predictions for various time intervals. For example, the forecasting results for the two outbound campaigns may be broken down to include a predicted number of outbound communications to be placed over one-hour time increments for a shift. These predicted numbers of outbound communications to be placed for the various time intervals may be predicated on attempting to achieve the goals defined for the two outbound campaigns. Thus, periodically during the shift, the actual number of communications placed over one or more time increments may be compared to forecasted numbers for the corresponding time increments and any derivation from the actual to the forecasted numbers may indicate a change in staffing requirements.

Figure 2A:
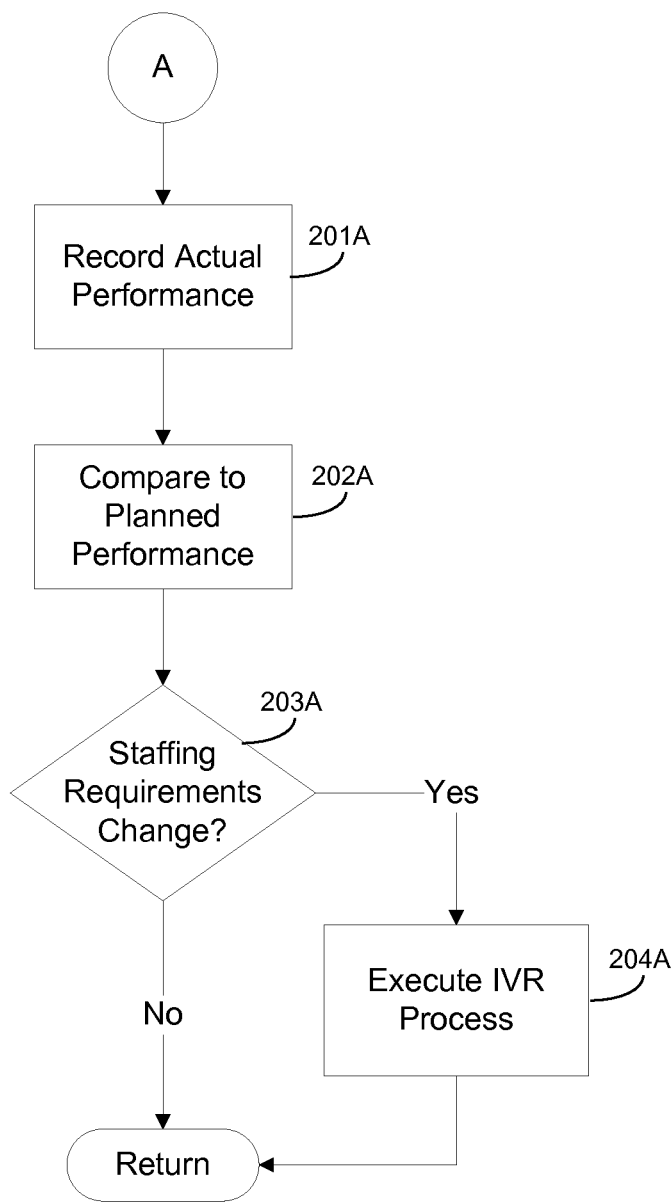
FIG. 2A is a flowchart illustrating a process for fulfilling staffing requirements using an IVR based on actual performance according to various embodiments of the present invention.

Turning briefly to FIG. 2A, this figure provides such a performance monitoring process according to one embodiment. In this embodiment, the process starts with recording actual performance information in Step 201A. For instance, returning to the example involving the two outbound campaigns, the actual number of communications placed for each hour of a shift may be recorded at the conclusion of the corresponding hour. For instance, in one particular embodiment, the CTI server 145 may monitor and record such information. Upon recording a particular hour's actual number of communications placed, the process may continue with the WFM 155 retrieving this number (along with one or more numbers for the previous hours in some instances) and comparing the actual number of communications placed for the hour (in addition to one or more additional hours in some instances) to the forecasted number(s) of communications to be placed to determine the difference between the actual number(s) and the forecasted number(s) in Step 202A. From this difference, the WFM 155 may determine whether any staffing requirements have changed in Step 203A.

For instance, in particular embodiments, the WFM 155 may apply a number of rules defined to make such a determination. For example, a rule may be defined that if the actual number of communications placed for the first seven hours of an eight-hour shift are forty percent higher than had been forecasted then the scheduled staff should be reduced by a member for the following shift in light of the reduced need to place as many communications for the next shift. As a result, in Step 203A, the WFM 155 determines the staffing requirements have changed as a result of the reduction in staffing needed for the following shift.

As noted above, this type of performance monitoring is typically conducted to try and identify changes in staffing requirements that may be considered more immediate (e.g., over the next couple of shifts) as opposed to staffing requirements that may be considered more in the future (e.g., over the next week). Thus, in various embodiments, this type of monitoring may be used to recognize short-term changes in staffing requirements that may occur over a day or from shift-to-shift (e.g., intraday changes) so that such changes may be addressed. However, as one of ordinary skill in the art will understand in light of this disclosure, monitoring rules may be defined to identify short-term and/or long-term changes in staffing requirements.

Returning to FIG. 2A, as a result of the WFM 155 determining the staffing requirements have changed for the following shift, the WFM 155 executes the IVR process described above in order to find a staff member scheduled for the next shift who is willing to take the shift off. Accordingly, the IVR 135 reports the results of finding the staff member willing to take the shift off to the WFM 155 and the WFM 155 updates the schedule to reflect the reduction in staff for the next shift.

Returning now back to FIG. 2, it is finally noted that in particular embodiments, the campaign(s), forecast, and resulting roster template and/or schedule may also be revised during execution of the campaign(s) based on performance data for the campaigns. This type of revision is typically performed to address long-term changes in staffing requirements with respect to the remainder of the campaign(s). Thus, after a portion of the campaigns have been conducted (e.g., periodically), the process may consider whether the campaigns have completed in Step 207. If not, then the historical data used in generating the forecast may be supplemented with performance data thus far for the campaigns in Step 208 and the campaigns, forecast, roster template, and/or schedule may be revised based on the supplemented historical dataset.

For instance, returning to the example, after the first two days have been completed for the two campaigns, performance data may be used to supplement the historical data and to revise the campaigns, forecast, roster template, and/or schedule. In this instance, the performance data may show that for the first two days of the campaigns, five hundred and fifty calls were made for the first campaign resulting in one hundred and fifty-one donations and five hundred calls were made for the second campaign reaching one hundred and seventy homeowners. Therefore, although the performance data for the second campaign appear to be on track to reach the goal for the second campaign over twelve days, the performance data for the first campaign appear to be too low for reaching the goal for the first campaign over ten days. Therefore, in this particular instance, the parameters for the first campaign may be revised to include an extra day for the campaign's duration. The forecast is then regenerated using the revised parameters and the first two days of performance data are included with the historical dataset. As a result, the roster template is revised to include new shifts for the remaining nine days of the campaign and the schedule is regenerated in light of the revised shifts. Again, the WFM 155 may conclude that one or more of the newly added shifts need to be fulfilled by making use of the IVR 135. Thus, the process as described above is repeated. A more detailed description of the various components involved in this process and corresponding functionality are described below.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Mange Schedule Module

Figure 3:
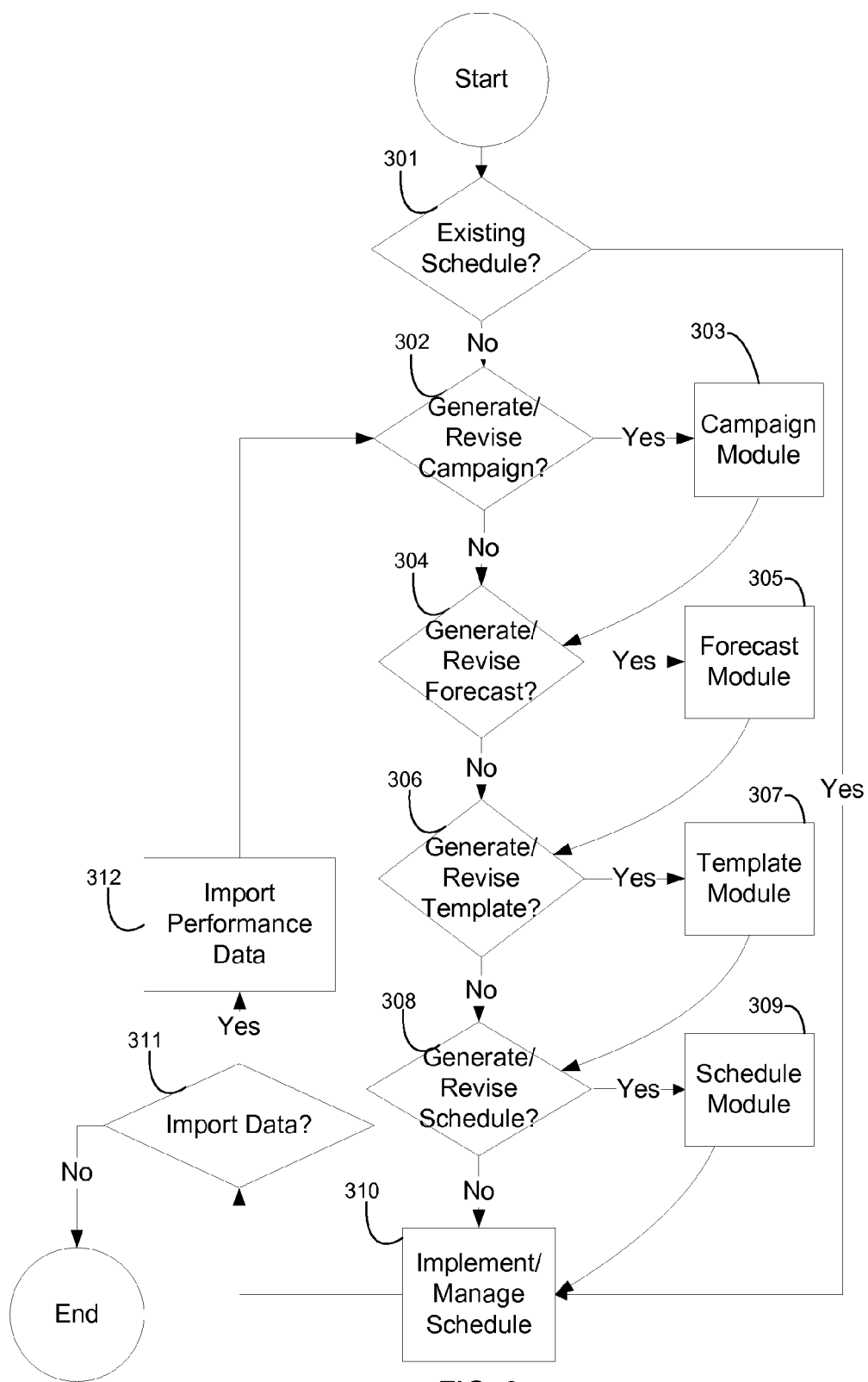
FIG. 3 is a flowchart illustrating a manage schedule module that can be used in accordance with various embodiments of the present invention.

Turning now to FIG. 3, additional details are provided regarding the process flow for managing a schedule to conduct one or more call center campaigns. Again, for purposes of simplicity, the description will focus on outbound call campaigns. In particular, FIG. 3 is a flow diagram showing a manage schedule module for performing such functionality according to one embodiment of the invention. For example, the flow diagram shown in FIG. 3 may correspond to steps carried out by a processor in a computing device, such as the WFM 155, as it executes the manage schedule module stored in the computing device's volatile and/or nonvolatile memory. In various embodiments, to facilitate the generation and management of one or more schedules directed to outbound campaigns, a call center administrator may be provided with one or more interfaces in communication with the manage schedule module. These interfaces may comprise one or more screens from which the user (e.g., call center administrator) may generate and manage schedules to be used in conjunction with conducting outbound campaigns. Further, in particular embodiments, the generation and management of one or more schedules directed to outbound campaigns may involve one or more automated processes in which the call center administrator need not be involved.

In general, the manage schedule module invokes a number of other modules to provide functionality needed to be performed in relation to generating, revising, implementing, and managing schedules for outbound campaigns. In turn, some of these modules may invoke other modules. The invocation of these modules may be by a user, such as the call center administrator, or may be automated depending on the embodiment and/or circumstances. Such functionality includes generating, revising, implementing, and managing outbound campaigns, forecasts, roster templates, and schedules. Further details with respect to the campaign, forecast, and template modules 303, 305, 307 may be found in U.S. patent application Ser. No. 13/556,961, entitled "Generating Communication Forecasts and Schedules Based on Multiple Outbound Campaigns" and filed Jul. 24, 2012, the contents of which are incorporated in their entirety by reference.

Turning now to FIG. 3, the manage schedule module may provide an interface screen ("home screen") with a number of different options for the user to select from. For example, if the user would like to simply revise a schedule previously generated and saved, the user selects the "manage schedule" option and the manage schedule module in Step 301 takes the user to one or more subsequent screens for selecting the schedule and making the appropriate revisions. For purposes of providing this disclosure, it is assumed the user is generating a schedule for one or more new outbound campaigns. However, one of ordinary skill in the art will understand that the functionality of the modules may apply to other types of campaigns, such as inbound campaigns. Further, one of ordinary skill in the art will understand that the functionality of the modules may be automated in various embodiments so that human interaction is not required.

Thus, the user initially selects the option to generate one or more new outbound campaigns and the manage schedule module determines this option has been selected in Step 302. As a result, the manage schedule module invokes the campaign module 303 for generating one or more outbound campaigns. According to various embodiments, the campaign module 303 enables a user to manage an individual outbound campaign by setting or modifying parameters associated with the campaign. For example, in particular embodiments, the campaign module 303 enables a user to indicate a particular campaign type for the campaign, set campaign objectives (e.g., goals), set a time period over which the campaign will run, set skills required by agents working the campaign, set minimum and maximum staff available to work the campaign for a particular interval of time, set outbound communication sources (e.g., outbound queues) for the campaign, or any combination thereof. Once the user has generated and defined an outbound campaign, the user is able to generate a forecast for the campaign.

Depending on the embodiment, once the user had completed generating the outbound campaign(s), the user may be returned to the home screen displaying the different options or may be taken directly to one or more screens for generating a forecast based on the new campaign(s). That is, depending on the embodiment, the manage schedule module may determine the option to generate a forecast has been selected in Step 304 by the user selecting the option on the home screen or by the campaign module 303 setting the option. Accordingly, the manage schedule module invokes the forecast module 305. Similar to the campaign module 303, in various embodiments, the forecast module 305 is configured to enable a user to generate new forecasts and/or to modify existing forecasts. Thus, in various embodiments, the forecast module 305 generates a forecast based on the parameters for the new campaign(s) and selected historical data on outbound communications conducted for one or more past campaign(s). Depending on the embodiment, the forecast provides predictions on the likelihood of meeting the objectives (e.g., goals) of the new campaign(s) and other related information (e.g., requirements) such as, for example, the number of communications to be made over the time period the campaign(s) are to be conducted.

Once the forecast module 305 has generated a satisfactory forecast, the manage schedule module determines whether the option to generate a roster template has been selected, shown as Step 306. Similar to the forecast option, depending on the embodiment, the template option may be selected by the user on the home screen or by the forecast module 305. Thus, the manage schedule module invokes the roster template module 307. Similar to the campaign and forecast modules 303, 305, the roster template module 307 is configured to enable a user to generate new roster templates and/or to modify existing roster templates according to various embodiments of the invention. As previous described, the roster template defines a group of shifts needed to meet the forecast requirements. In various embodiments, the user may define further characteristics (e.g., parameters) for the roster template. Once the user is satisfied with the roster template, the roster template is saved.

At this point, the manage schedule module determines whether the option to generate a schedule has been selected, shown as Step 308. Again, the option may be selected by the user from the home screen or by the roster template module 307 depending on the embodiment. Upon determining the option to generate a schedule has been selected, the manage schedule module invokes the schedule module 309. Once the schedule module 309 has been invoked, the user generates a schedule for conducting the campaign(s) by identifying staff to fill the roster template. As is further detailed below and in FIGS. 4-6, during the scheduling process, one or more of the shifts of the related roster template may be fulfilled by staff by making use of the IVR 135. In addition, similar to the roster template, the user may define further characteristics (e.g., parameters) for the schedule. Once the user is satisfied with the schedule, the schedule is saved.

Once the schedule has been generated and saved, the user may be presented with one or more screens to implement the schedule, shown as Step 310. Depending on the embodiment, implementation of the schedule may involve different processing operations. For instance, in one embodiment, the schedule may simply be posted so that staff may view the schedule to determine when they are to work during the outbound campaign(s). However, in other embodiments, the schedule (and/or information from the schedule) may be uploaded to one or more other business enterprise systems in the call center to facilitate further functionality during the outbound campaign(s). For example, in particular embodiments, supervisors may make use of monitoring systems to ensure agents are adhering to their schedules and working efficiently during the outbound campaign(s). Information taken from the schedule (such as, for instance, which agents are scheduled to work during a particular shift) may facilitate such monitoring.

As the campaign(s) are carried out in the call center, the user (e.g., call center administrator) may wish to manage the schedule based on changing circumstances surrounding the campaign(s). For instance, the user may revise the schedule based on performance data collected for a portion of the campaign(s) that has been carried out. That is, after the campaign(s) have been conducted for a period of time, the user may revise the campaign(s), forecast, roster template, and/or schedule based on performance data collected for the campaign(s) during this period of time. Thus, returning to FIG. 3, once the user is presented with the one or more screens to manage the schedule, the user may indicate (e.g., select an option on a screen) that he would like to import performance data for the campaign(s) associated with the selected schedule. In response, the manage schedule module determines the user would like to import performance data, shown as Step 311.

In one embodiment, the user may provide a source for the performance data prior to selecting the option to import the data. That is, for example, the performance data may be saved in a file or database and the user identifies the location of the file or database so that, upon selecting the option to import the performance data, the data is imported. However, in another embodiment, the user may first be taken to a different screen upon selecting the option to import the performance data. Once on the screen, the user may then identify the source of the performance data and select the option to "import." Those of ordinary skill in the art can envision numerous ways in which the user can import the performance data in light of this disclosure. At this point, the manage schedule module imports the performance data, shown as Step 312.

After the performance data has been imported, the user may revise the campaign(s), forecast, roster template, and/or schedule. For example, in a typical situation, the user may rerun the forecast based on the performance data to determine whether the objectives for the campaign(s) may still be met in light of the current schedule and performance thus far. If the results of the forecast are unsatisfactory, the user may then revise the campaign(s), roster template, and/or schedule accordingly to produce a revised schedule. Thus, in various embodiments, the managing schedule module allows monitoring the performance of one or more campaigns and revising the schedule based on the monitored performance.

As already indicated, in various embodiments, the functionality of the modules may be automated. For instance, the managing schedule module may be configured to periodically import performance data for the campaign(s) and to revise the campaign(s), forecast, roster template, and/or schedule accordingly. For example, after the campaign(s) have been conducted for a period of time, the managing schedule module may determine whether the campaign(s) have been conducted for the time period and are still active for another period of time. That is, the managing schedule module may be configured to look at the start and end times (e.g., dates) for the campaigns and determine the campaigns have been conducted for a period of time and still have a period of time before they are finished. Thus, the managing schedule module may import performance data for the campaign(s) automatically and may revise the campaign(s), forecast, roster template, and/or schedule accordingly. Any new shifts added as a result of revising the schedule may be fulfilled by making use of the IVR 135. As a result, the schedule may be automatically maintained based on the performance of the campaign(s) without human involvement. Further detail is now provided on the schedule module 309 and IVR module with regard to various embodiments of the invention.

Schedule Module

Figure 4:
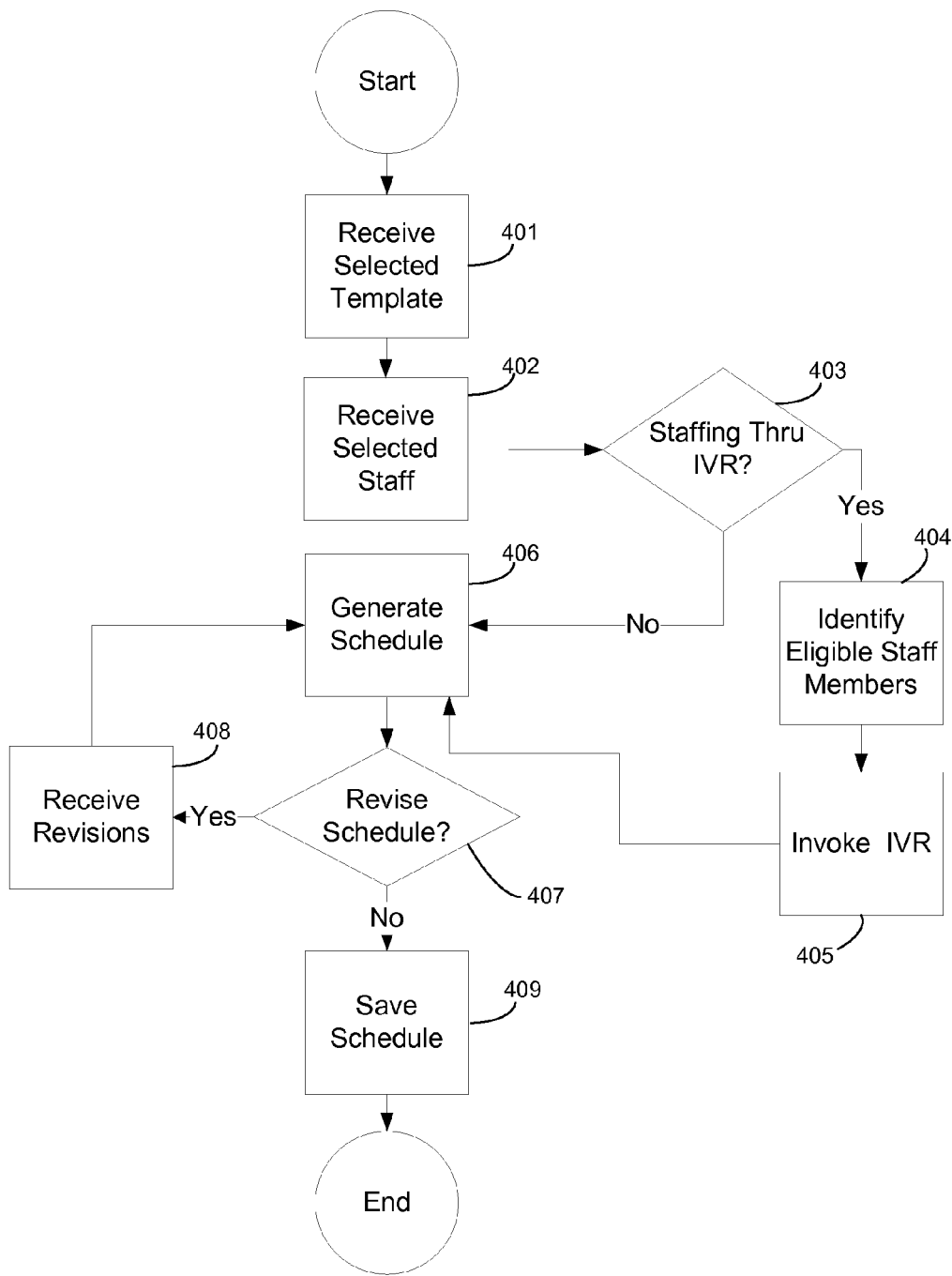
FIG. 4 is a flowchart illustrating a schedule module that can be used in accordance with various embodiments of the present invention.

Turning now to FIG. 4, additional details are provided regarding the process flow for creating and managing schedules for outbound campaigns. In particular, FIG. 4 is a flow diagram showing a schedule module 309 for performing such functionality according to one embodiment of the invention. In various embodiments, the schedule module 309 may be invoked by the manage schedule module described above whenever one or more schedules for outbound campaigns are to be generated or managed. However, it should be understood that in other embodiments, the schedule module 309 may be a stand-alone computer program module. Thus, the flow diagram shown in FIG. 4 may correspond to steps carried out by a processor in a computing device, such as the WFM 155 for example, as it executes the schedule module 309 stored in the computing device's volatile and/or nonvolatile memory.

According to the embodiment shown in FIG. 4, the schedule module 309 is configured to enable a user to generate new schedules and/or to modify schedules. For example, the user may be provided with an initial screen that provides a listing of existing schedules from which the user may select a schedule to modify. Thus, the steps displayed in FIG. 4 may be carried out for a new or existing schedule. However, for purposes of this disclosure, it is assumed the user has indicated he would like to generate a new schedule based on an existing roster template for one or more outbound campaigns.

Generally, the schedule module 309 of various embodiments is configured to generate a schedule by allocating staff to an existing roster template that has been created based on a forecast. The goal is that when the schedule is generated, the schedule meets the forecast requirements of the corresponding forecast and subsequent roster template. In general, a "schedule" is understood to be a set of shift cycles with specific staff allocated to the shifts. That is, a schedule is understood to be a set of shift cycles with specific staff members assigned to staff member positions within the shifts that make up the shift cycles. For example, a shift in a shift cycle may include five call center agent positions. Thus, in this example, the schedule includes the shift for the shift cycle with five staff members of the call center (e.g., agents) assigned to the five call center agent positions for the shift.

For purposes of this disclosure, a "shift cycle" is understood to be a series (e.g., group) of shifts. Depending on the embodiment, a shift cycle may be generated to contain any realistic sequence of shifts and can be any length. For example, a shift cycle may include a day shift, an evening shift, and a night shift for each day of seven consecutive days (e.g., a week) totaling twenty-one shifts for the shift cycle.

In various embodiments, the schedule module 309 uses availability information for each staff member to determine how the shifts are allocated. Depending on the embodiment, this availability information may be made available through any number of different mechanisms such as, for example, one or more databases holding information on staff members or through a manage roster program used to manage the staff members of the call center and their corresponding information.

Turning now to FIG. 4, the user reviews a listing of existing roster templates presented on a computer screen and selects the appropriate roster template from the listing. In turn, the schedule module 309 receives the selected roster template in Step 401. At this point, the user identifies the staff to apply to the selected roster template. In various embodiments, the user is provided with a screen that allows the user to pick a location where to save the schedule and one or more staff to apply to the roster template. As previously described, a staff is a group of employees of the call center and is typically defined based on a number of different attributes. For instance, a staff may be a group of call center employees working at a particular location.

After selecting one or more staff, the user is provided with a "Select Staff" screen in particular embodiments. Such a screen enables the user to manually include and/or exclude members of the selected staff from being placed on the schedule. For example, in one embodiment, the screen may show a listing of all of the staff members along with a checkbox beside each staff member's name. The checkbox for each member may be initially checked indicating the staff member is eligible to be scheduled and the user may go through the list of members and un-checks the checkboxes for any members the user would like to exclude from being scheduled.

In addition, in particular embodiments, the screen may provide the user with other capabilities to identify staff members eligible to be scheduled (e.g., to apply to the roster template). For instance, in one embodiment, a checkbox may be provided that indicates to "use only primary skills." If checked, the schedule module only allocates staff members with the appropriate primary skills to shifts in the roster template that require those skills in the skills profile. In addition, in another embodiment, some of the members may have a base roster defined that indicates the members receive the same schedules over a defined period of time (e.g., weekly). That is, for example, for a particular staff member with a base roster, the particular member receives the same shifts on the same days for every schedule. In this embodiment, the screen may allow the user to indicate whether staff members' base rosters should be ignored or adhered to, or whether such members should be excluded from the staff applied to the roster template.

Thus, after the user has indicated the one or more staff to apply to the selected roster template, the schedule module 309 receives the selection in Step 402. At this point, the schedule module 309 attempts to assign various staff members to the shifts that make up the roster template. That is, in various embodiments, the schedule module 309 attempts to create a schedule by fulfilling the shifts with various staff members from the identified staff.

In attempting to fulfill the shifts with staff members, the schedule module 309 may identify one or more of the shifts (e.g., one or more staff member positions) that are to be fulfilled by making use of the IVR 135. For instance, in various embodiments, one or more rules may be setup that the schedule module 309 uses to identify these particular shifts. For example, one rule may be that if a shift is scheduled to take place within the next twenty-four hours the shift should be scheduled by making use of the IVR 135. Another rule, for example, may be that if the shift has been added after the initial schedule has been generated and posted the shift should be scheduled by making use of the IVR 135. Those of ordinary skill in the art can contemplate numerous rules that may be implemented to identify such shifts in light of this disclosure. Thus, in Step 403, the schedule module 309 determines whether one or more shifts exist that should be staffed by making use of the IVR 135.

If so, in Step 404, the schedule module 309 identifies the staff members who are eligible to fulfill the identified shifts. Thus, in various embodiments, additional rules may be implemented to aid the schedule module 309 in identifying such staff members. For example, such rules may be based on the number of hours a staff member has already worked over a previous period of time (e.g., the previous week), a staff member's skill set and the skills required to work the identified shifts, whether staff members may be paid overtime to work the identified shifts, etc. Further, in particular embodiments, the schedule module 309 may set a priority order for the eligible staff members that may be used to fulfill the identified shifts. That is, in these embodiments, the schedule module 309 may set an order in which the eligible staff members should be contacted to fulfill the identified shifts.

Once the schedule module 309 has identified the eligible staff members, the schedule module 309 invokes the IVR 135 to fulfill the identified shifts, shown as Step 405. (It is noted that in particular embodiments, the schedule module 309 may instead invoke some other component of the call center, such as a dialer 150, that is working in concert with the IVR 135.) For instance, in particular embodiments, the schedule module 309 sends the IVR 135 information on the identified shifts that need to be fulfilled and information on the staff members eligible to fulfill the shifts. (It should also be noted that in particular embodiments, the IVR 135 may be configured to identify the eligible staff members instead of the schedule module 309. Thus, in these particular embodiments, the schedule module 309 may simply send the IVR 135 information on the identified shifts.)

As is discussed in greater detail below, at this point, the IVR 135 fulfills the identified shifts by contacting the eligible staff members. Once the IVR 135 has completed fulfilling the shifts (or has fulfilled as many of the shifts as possible), the IVR 135 sends information on the staff members who have agreed to fulfill one or more of the identified shifts to the schedule module 309. In turn, the schedule module 309 generates a schedule based on the selected roster template, staff, and information received from the IVR 135, shown as Step 406. That is, the schedule module 309 generates a schedule by fulfilling the identified shifts with the staff members identified in the information received from the IVR 135 and by fulfilling the remainder of the shifts with staff members using typical processing. For instance, in various embodiments, the schedule module 309 may make use of other information and rules associated with the campaigns, roster template, and/or call center in populating the remainder of the shifts of the schedule with staff members.

At this point, the user may review the generated schedule to determine whether the schedule is acceptable or whether the schedule should be revised. In addition, the user may review the shifts and/or staff member positions that the IVR 135 was unable to fulfill. For instance, in various embodiments, the user is provided with one or more screens for reviewing details of the schedule and/or the roster template and making any necessary revisions accordingly. For example, in particular embodiments, the user is provided with the capability to review and revise the various profiles (e.g., shifts, staffing, skills, and activities) of the roster template as appropriate. Depending on the embodiment, such revisions may be permanently applied to the roster template or may only be applied in the context of the current schedule. Thus, the user may review the schedule details and revise any of the parameters described above with respect to the schedule.

At this point, in Step 407, the schedule module 309 determines whether any such parameters have been revised. If so, the schedule module 309 receives the parameters, at Step 408, and regenerates the schedule based on the revisions, in Step 406. This process continues until the user is satisfied with the schedule. Once satisfied, the user chooses to save the schedule and the schedule module 309 saves the schedule in the appropriate location, shown as Step 409.

At this point, the schedule may now be used to carry out the one or more campaigns tied to the schedule. In addition, as previously described, the schedule may be revised as the campaigns are carried out based on actual performance to adjust the schedule to be better aligned with the campaigns' goals.

For instance, if the one or more campaigns associated with the generated schedule are to take place over three weeks, the schedule may be revised based on the performance data collected on the one or more campaigns over the first week. As previously mentioned, depending on the embodiment, the revision may be carried out automatically or manually by a user. Thus, in typical embodiments, the historical dataset used to generate the original forecast for the one or more campaigns is supplemented with the performance data for the first week of conducting the one or more campaigns and the forecast is regenerated based on the supplemented historical dataset. As a result, a revised roster template may be generated that includes one or more additional shifts and/or one or more revised shifts requiring additional staff members (e.g., requiring additional staff member positions) or staff member reductions (e.g., requiring staff member positions to be reduced).

For example, the performance data for the first week of the one or more campaigns may indicate that for the goals of the campaigns to be met, two additional shifts need to be added to the remaining two weeks of the campaigns. At this point, in various embodiments, the IVR 135 may be used to fulfill these two additional shifts with staff members. However, in another example, the performance data for the first week of the one or more campaigns may instead indicate that the campaigns are performing better than expected (e.g., the campaigns are performing better than forecasted) and that the number of staffing required to work the remaining two weeks of the campaigns can be reduced. At this point, in various embodiments, the IVR 135 may be used to identify staff members willing to give up working shifts no longer required. Thus, an advantage provided by various embodiments of the invention is that call center campaigns may be better managed (e.g., schedules adjusted) so that the goals for such campaigns can be met and/or the cost of conducting such campaigns can be minimized.

Monitoring Module

Figure 5:
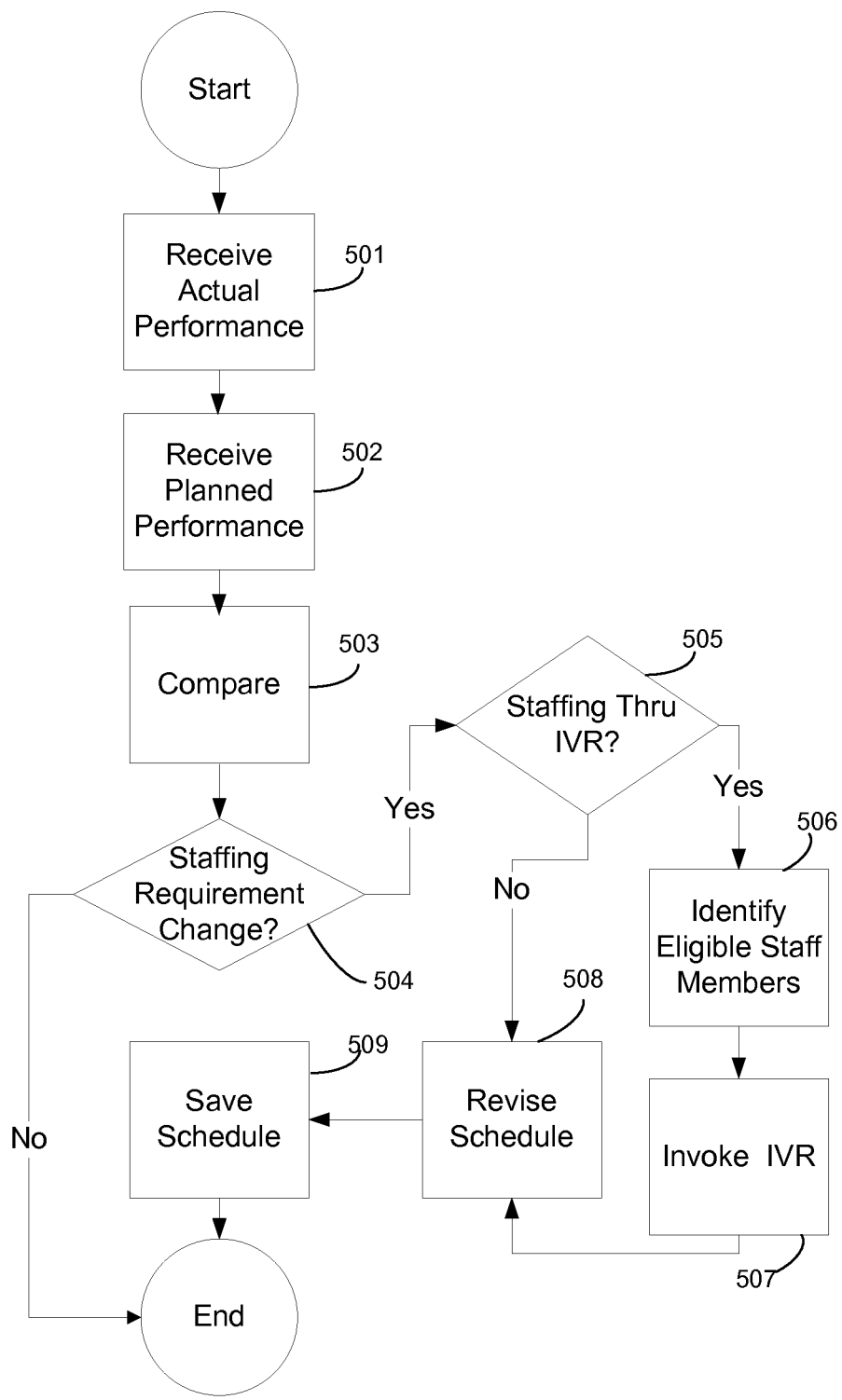
FIG. 5 is a flowchart illustrating a monitoring module that can be used in accordance with various embodiments of the present invention.

As previously mentioned, monitoring of performance information related to campaigns may be conducted in various embodiments to identify changes in staffing requirements. As further mentioned, typically such monitoring is performed to attempt to identify short-term changes that may occur in staffing requirements and to address these short-term changes. Thus, FIG. 5 provides details regarding a process flow for monitoring performance information to identify changes in staffing requirements for one or more outbound campaigns and for addressing such changes. In particular, FIG. 5 is a flow diagram showing a monitoring module for performing such functionality according to one embodiment of the invention.

For instance, in particular embodiments, the monitoring module may be periodically invoked by the WFM 155. That is, for example, the WFM 155 may be configured in one embodiment to invoke the monitoring module at the end of a time interval (e.g., at the end of every hour) for a particular shift being conducted for an outbound campaign. Thus, the flow diagram shown in FIG. 5 may correspond to steps carried out by a processor in a computing device, such as the WFM 155, as it invokes and executes the monitoring module stored in the computing device's volatile and/or nonvolatile memory.

Turning now to FIG. 5, once invoked, the monitoring module retrieves performance information that has been collected for the corresponding call campaign in Step 501. For instance, as the outbound campaign is being executed, one or more components of the call center architecture 100 may collect and store information on the performance of the outbound campaign. For example, a dialer 150 may place a number of calls to parties over a particular time period and the CTI server 145 may record the number of calls placed over the particular time period. Further, the results of placing these calls may be recorded. For example, the dialer 150 or other component of the call center architecture 100 may determine a result for each of the calls and this result may be recorded. For instance, the dialer 150 may determine that a call was answered by a party or an answering machine or was not answered because the call never connected, e.g., the call was made to a disconnected telephone number. Further, an agent fielding a connected call may record information on the results of the connected call such as the call reached the intended party and/or the agent was successful in completing the purpose of placing the call to the party (e.g., the agent was successful in collecting on a debt, soliciting a donation, or providing intended information to the party).

At this point, the monitoring module retrieves planned performance information for the corresponding outbound campaign in Step 502. For example, in particular instances, a forecast may have been generated for the outbound campaign and the forecast may include forecasted information for the individual time intervals that make up a shift of the campaign. For instance, this forecasted information may include a predicted number of communications that are to occur for each time interval, a forecasted number of staff that is to work each time interval, and/or a forecasted average handle time for each communication that occurs in each time interval.

In addition, in particular embodiments, the planned performance information may include instead of or in addition to forecasted information, information set up by call center personnel such as an administrator. That is, in certain instances, the planned performance information may include a number of communications that are planned to occur for each time interval instead of a forecasted number of communications that are to occur for each time interval and so forth. Further, the planned performance information may include other information such as thresholds set by call center personnel with respect to the performance of the outbound campaign. For example, the planned performance information may include a threshold value for the number of communications that are to occur for each time interval of a shift for the outbound campaign. One of ordinary skill in the art can envision other information that may be included in the planned performance information in light of this disclosure.

Thus, in Step 503, the monitoring module compares the actual performance information for the outbound campaign with the planned performance information for the outbound campaign to determine whether a change has occurred with respect to staffing requirements for the outbound campaign. For instance, in particular embodiments, one or more rules are established by call center personnel to enable the monitoring module to determine whether such a change has occurred. Thus, as a result of the monitoring module conducting a comparison between the actual performance information and the planned performance information and applying the defined rules, the monitoring module determines whether a change in staffing requirements with respect to the outbound campaign has occurred in Step 504.

For example, FIG. 6 provides information that may comprise the actual performance information and planned performance information for eight one-hour time intervals for a particular shift for the outbound campaign. The table provided in FIG. 6 lists the planned performance information for the outbound campaign as the number of forecasted outbound calls to be placed 601, the forecasted average handle time (AHT) 602 in minutes, the number of forecasted staff members 603, and the number of staff members actually scheduled 604 for every one-hour time interval of the eight-hour shift. Further, the table lists the actual performance information for the outbound campaign as the actual number of outbound calls 605, the actual AHT 606, and the actual number of staff members 607 for the first six one-hour time intervals of the eight-hour shift. In this particular instance, the remaining two one-hour intervals have yet to occur for the shift.

For this particular example, the call center administrator has set up a rule that if three consecutive one-hour time intervals have a negative difference between the actual outbound calls made for the time interval and the forecasted outbound calls made for the time interval of ten percent or more, then another staff member should be added to the next shift for the outbound campaign. Thus, in this instance, the call campaign has had three consecutive one-hour time intervals (i.e., $3^{rd}$ Hour 608, $4^{th}$ Hour 609, and $5^{th}$ Hour 610) that have a difference between the actual outbound calls made for the time interval and the forecasted outbound calls made for the time interval of ten percent or more (i.e., (15%), (18%), and (17%)). Therefore, the monitoring module determines that a change in staffing requirements for the outbound campaign has occurred.

As one of ordinary skill in the art can understand in light of this disclosure, any number of different rules may be implemented to identify when a change in staffing requirements may have occurred. For instance, in the example, the call center administrator may implement similar rules with respect to forecasted AHTs and actual AHTs and/or forecasted number of staff members, scheduled number of staff members, and actual number of staff members that work the eight one-hour time intervals. Specifically, for example, the number of staff members scheduled to work the $5^{th}$ 610, $6^{th}$ 611, $7^{th}$ 612, and $8^{th}$ 613 one-hour time intervals of the shift is six. However, the number of actual staff members who worked the $6^{th}$ 611 one-hour time interval is five. This may have occurred because a staff member became sick during the shift and went home during the $6^{th}$ hour of the shift. In this instance, a rule may be implemented that indicates that if the difference between scheduled staff members and actual staff members is more than negative ten percent for any one-hour time interval occurring over the last four time intervals for the shift, then a staff member should be added to the following shift. Thus, in this instance, the monitoring module determines an additional staff member should be added to the following shift to help elevate the missed productivity of the staff member having to leave early because of sickness.

Accordingly, as a result of monitoring actual performance information and comparing such information to planned performance information in various embodiments, the call center is able to identify changes in staffing requirements and to react to such changes. It should be noted that changes in staffing requirements may not always be associated with changes that involve the need to add staff members. In some instances, the changes in staffing requirements may involve the need to reduce staff members. For example, a rule may be implemented that if three consecutive one-hour time intervals have a positive difference between the actual outbound calls made for the time interval and the forecasted outbound calls made for the time interval of ten percent or more, then the staff for the next shift should be reduced by one staff member as a result of the productivity for the outbound campaign exceeding the forecast. Therefore, monitoring the actual performance of the outbound campaign may not only identify changes in staffing requirements that may need to be addressed by adding staff so that goals for the campaign may be reached, but may also identify changes in staffing requirements that signal reducing staff as a result of better-than-forecasted performance, which can lead to cost savings for the call center.

Returning now to FIG. 5, in Step 505, the monitoring module determines whether the change in staffing requirements is to be addressed by utilizing the IVR 135. As previously mentioned, in many instances, the monitoring of actual performance will identify short-term changes in staffing requirements. Thus, in many of these instances, the IVR 135 will need to be utilized to address these short-term changes. For instance, if the monitoring module determines a staff member is to be added to the schedule for the next shift in the outbound campaign, the monitoring module would recognize this as an instance in which "normal" scheduling practice is not sufficient for providing the additional staff member and would recognize that the additional staff member position should be filled by using the IVR 135. Thus, similar to the schedule module 309, one or more rules may be implemented that the monitoring module uses to determine whether the IVR 135 should be used to address the change in staffing requirements.

If the monitoring module does determine the change in staffing requirements (e.g., the need to added staff or reduce staff) is to be addressed by using the IVR 135, similar to the schedule module 309, the monitoring module identifies the staff members who are eligible to address the change in staffing requirements in Step 506. Thus, in various embodiments, additional rules may be implemented to aid the monitoring module in identifying such staff members. Further, in particular embodiments, like the schedule module 309, the monitoring module may set a priority order for the eligible staff members that may be used to address the change in staffing requirements.

Once the monitoring module has identified the eligible staff members, the monitoring module invokes the IVR 135 to fulfill the identified shifts, shown as Step 507. (It is noted that in particular embodiments, like the schedule module 309, the monitoring module may instead invoke some other component of the call center, such as a dialer 150, that is working in concert with the IVR 135.) Thus, in particular embodiments, the monitoring module sends the IVR 135 information on the identified changes to the staffing requirements (e.g., the addition or reduction of one or more staff positions) and information on the staff members eligible to fulfill the changes.

At this point, the IVR 135 fulfills the changes to the staffing requirements by contacting the eligible staff members. Once the IVR 135 has completed fulfilling the changes (or has fulfilled as many of the changes as possible), the IVR 135 sends information on the staff members who have agreed to fulfill one or more of the changes to staffing requirements to the monitoring module. In turn, the monitoring module revises the schedule for the outbound campaign based on the information received from the IVR 135, shown as Step 508. That is, the monitoring module revises the schedule to reflect the identified changes with the staff members identified in the information received from the IVR 135 who have agreed to the changes, e.g., the monitoring module revises the schedule to reflect the addition or reduction in staffing requirements and the corresponding staff members affected. Finally, the monitoring module saves the revised schedule in Step 509.

It should be noted that in particular embodiments, the monitoring module may be configured to revise the schedule by invoking the schedule module 309 to do so. That is, in these particular embodiments, the monitoring module 309 may identify the change to the staffing requirements and conveys this information to the scheduling module 309 and the schedule module 309, in turn, revises the schedule accordingly. Therefore, for these particular embodiments, the monitoring module may or may not invoke the IVR 135, if needed, to help fulfill the change in the staffing requirements. Instead, in some of these particular embodiments, the schedule module 309 may also be configured to invoke the IVR 135, if needed, once the schedule module 309 has received the change in the staffing requirements.

IVR Module

Figure 7:
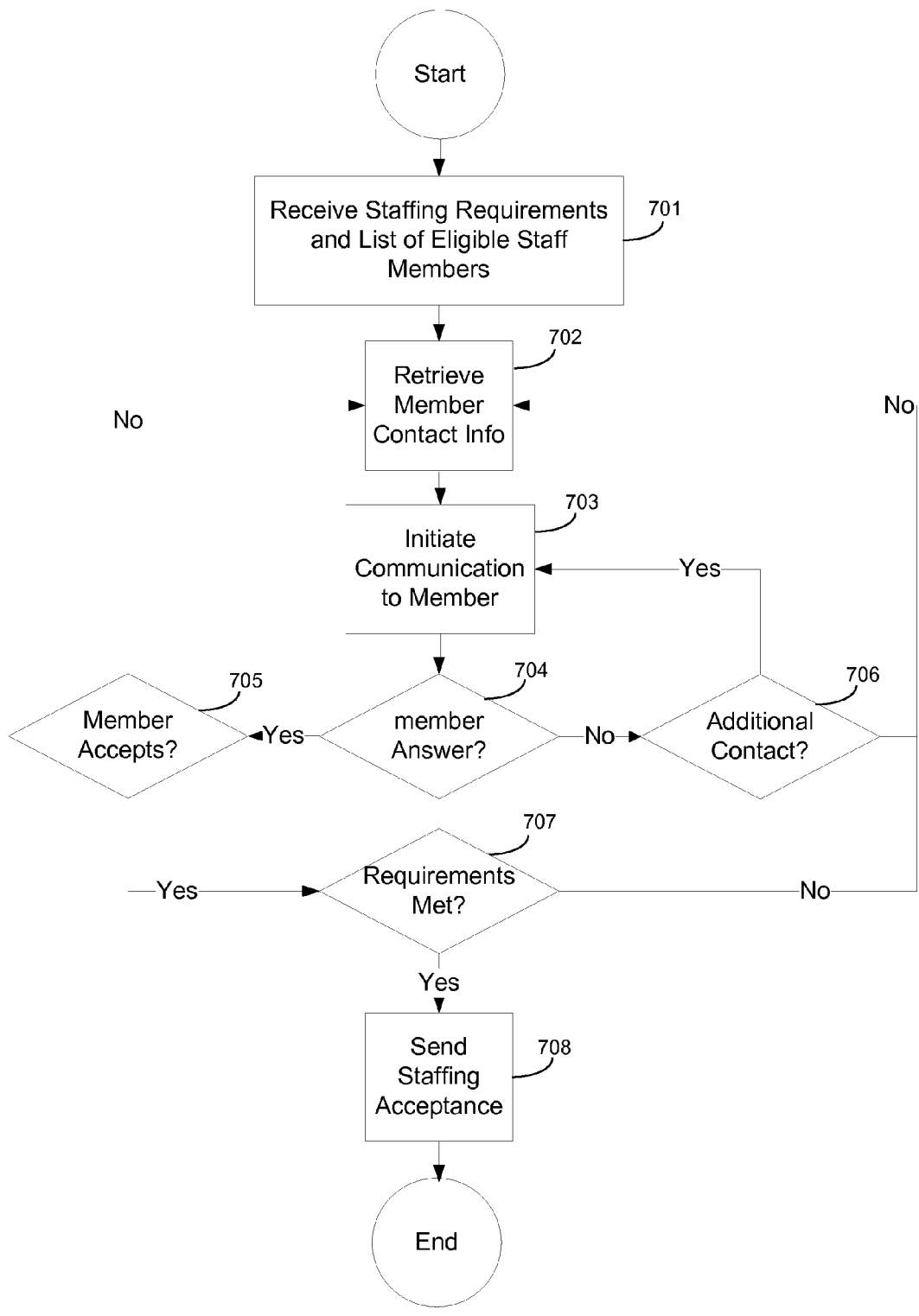
FIG. 7 is a flowchart illustrating an IVR module that can be used in accordance with particular embodiments of the present invention.

Turning now to FIG. 7, additional details are provided regarding the process flow for fulfilling or reducing one or more staff member positions for one or more shifts by using an IVR 135. In particular, FIG. 7 is a flow diagram showing an IVR module for performing such functionality according to one embodiment of the invention. In various embodiments, the IVR module may be invoked by the schedule module 309 or the monitoring module described above whenever one or more shifts and/or staff member positions for a shift are identified as needing to be fulfilled and/or reduced/eliminated by utilizing the IVR 135. However, as further discussed below, in other embodiments, the IVR module may be invoked by another component of the call center such as the dialer 150 once a communication has been established with a party. Thus, the flow diagram shown in FIG. 7 may correspond to steps carried out by a processor in a computing device, such as the IVR 135 for example, as it executes the IVR module stored in the computing device's volatile and/or nonvolatile memory.

As previously mentioned, in various embodiments, the schedule module 309 or monitoring module identifies one or more shifts and/or one or more staff member positions for a particular shift that need to be fulfilled or reduced/eliminated by using the IVR 135. In addition, in various embodiments, the schedule module 309 or monitoring module identifies the staff members who are eligible to fulfill or volunteer to give up the identified shifts and/or staff member positions. For the particular embodiment shown in FIG. 7, the schedule module 309 or monitoring module invokes the IVR 135 (e.g., IVR module) by sending information on the identified shifts, staff member positions, and/or eligible staff members to the IVR 135 (e.g., IVR module). Accordingly, the IVR module receives this information in Step 701. For example, in this instance, the IVR module receives information from the schedule module 309 indicating one or more staff member positions needing fulfilling for one or more shifts and the agents eligible to fulfill these staff member positions.

In response, the IVR module next retrieves contact information for the staff member the IVR module is going to contact, shown as Step 702. Depending on the embodiment, the IVR module may retrieve this information from the original information received from the schedule module 309 or may retrieve this information from another source. For instance, in one embodiment, the IVR module receives a priority listing of eligible staff members from the schedule module along with contact information for each member. Thus, the IVR module reads the first staff member from the list and corresponding contact information for the staff member.

Next, in Step 703, the IVR module initiates a communication to the staff member. Depending on the embodiment, this communication may be one of any several different types of communications such as, for example, a phone call, a text message, or a Web chat. In addition, depending on the embodiment, the IVR module may initiate the communication by utilizing a number of different mechanisms. For example, if the communication entails a telephone call or text message, the IVR module may initiate the communication by instructing a dialer 150 to place the communication and by providing the contact information to the dialer 150. Thus, the IVR module attempts to contact the staff member to inquire as to whether the staff member would like to fulfill one or more of the staff member positions for one or more of the shifts.

In Step 704, the IVR module determines whether the staff member has answered the communication. For example, if the IVR module has initiated a phone call being placed to the staff member, the IVR module receives an indication as to whether the call has been answered by the staff member. That is, for example, the IVR module receives an indication from the dialer 150 as to whether a connection has occurred within a certain number of ring tones. If the call is answered in this example, the IVR module may receive the connected call, may announce to the answering party the reason for calling, and may inquire as to whether the correct party has answered the call. For instance, the IVR module may play a recording asking the answering party to either select a particular key or to speak the work "yes" to indicate that the staff member is the party who has answered the call.

If the IVR module determines the staff member has not answered the communication, the IVR module may determine whether a different contact is provided for the staff member, shown as Step 706. For instance, the contact information for the particular staff member may include a telephone number for the staff member's home and a telephone number for the staff member's cellular phone. Thus, the IVR module may initially attempt to contact the staff member on the member's home phone and after failing to contact the staff member on his home phone, the IVR module may attempt to contact the staff member on his cellular phone.

If an additional contact is available for the staff member, the IVR module repeats Step 703 and attempts to initiate contact with the staff member by having a communication placed using the additional contact. If an additional contact is not available for the staff member, the IVR module repeats Step 702 and moves to the next eligible staff member. It is noted that in some embodiments, a plurality of staff members may be contacted in parallel by the IVR module for expediency, as opposed to in a strictly serial manner as shown in FIG. 7. In addition, although not shown in FIG. 7, it is noted that in various embodiments the IVR module may be configured to record the attempts to contact the staff member so that a record of such contact attempts is kept in the event such information is needed. For instance, in the event a particular staff member files a complaint that he was not given the opportunity to fulfill a particular shift, these records may serve to show that the IVR module attempted to contact him with regard to the shift.

Continuing, if the IVR module determines the staff member has answered the communication, the IVR module inquires as to whether the contacted staff member agrees to fulfill one or more of the staff member positions for the one or more shifts in Step 705. Depending on the embodiment, the IVR module may accomplish this task by asking questions and receiving answers by either the staff member selecting one or more keys and/or by speaking one or more words the IVR module recognizes.

If the staff member does not agree to fulfill one or more of the staff member positions, the IVR module returns to Step 702 and retrieves contact information for the next eligible staff member. At this point, the IVR module repeats the same process as described above with respect to the unfulfilled staff member positions and the next eligible staff member.

It should be noted that depending on the embodiment, the IVR module may be configured to inquire about one or more staff member positions at any one time the IVR module has contacted an eligible staff member. For instance, in one embodiment, the IVR module may be configured to inquire about any and all available staff member positions that a particular staff member may be eligible to fulfill once the IVR module has contacted the particular staff member. That is, for example, if a particular staff member is eligible to fulfill a staff member position for two different shifts happening over two days, the IVR module may be configured to inquire about the two different shifts during the same contact (e.g., same phone call) with the particular agent. However, in other embodiments, the IVR module may be configured to only fulfill a single staff member position for a single shift during any one contact. Thus, in this instance, the IVR module would have to contact the particular agent twice with respect to the two different shifts occurring over the two different days to inquire whether the staff member agrees to fulfill either of these two positions.

If the staff member does agree to fulfill one or more of the staff member positions, the IVR module next determines whether all of the requirements for the staff member positions and corresponding shifts have been met in Step 707. If all the staffing requirements have been met (or all of the eligible staff members have been contacted), the IVR module sends the staffing acceptance to the schedule module in Step 708. Depending on the embodiment, the IVR module may be configured to send all of the staffing acceptances at one time for the staffing requirements or may be configured to send each staffing acceptance separately. At this point, the schedule module 309 receives the staffing acceptance and continues with generating the schedule as previously described. (It is noted that in various embodiments, the IVR module also sends information on any shifts and/or staff member positions that the IVR module was unable to fulfill to the schedule module 309.)

Figure 8:
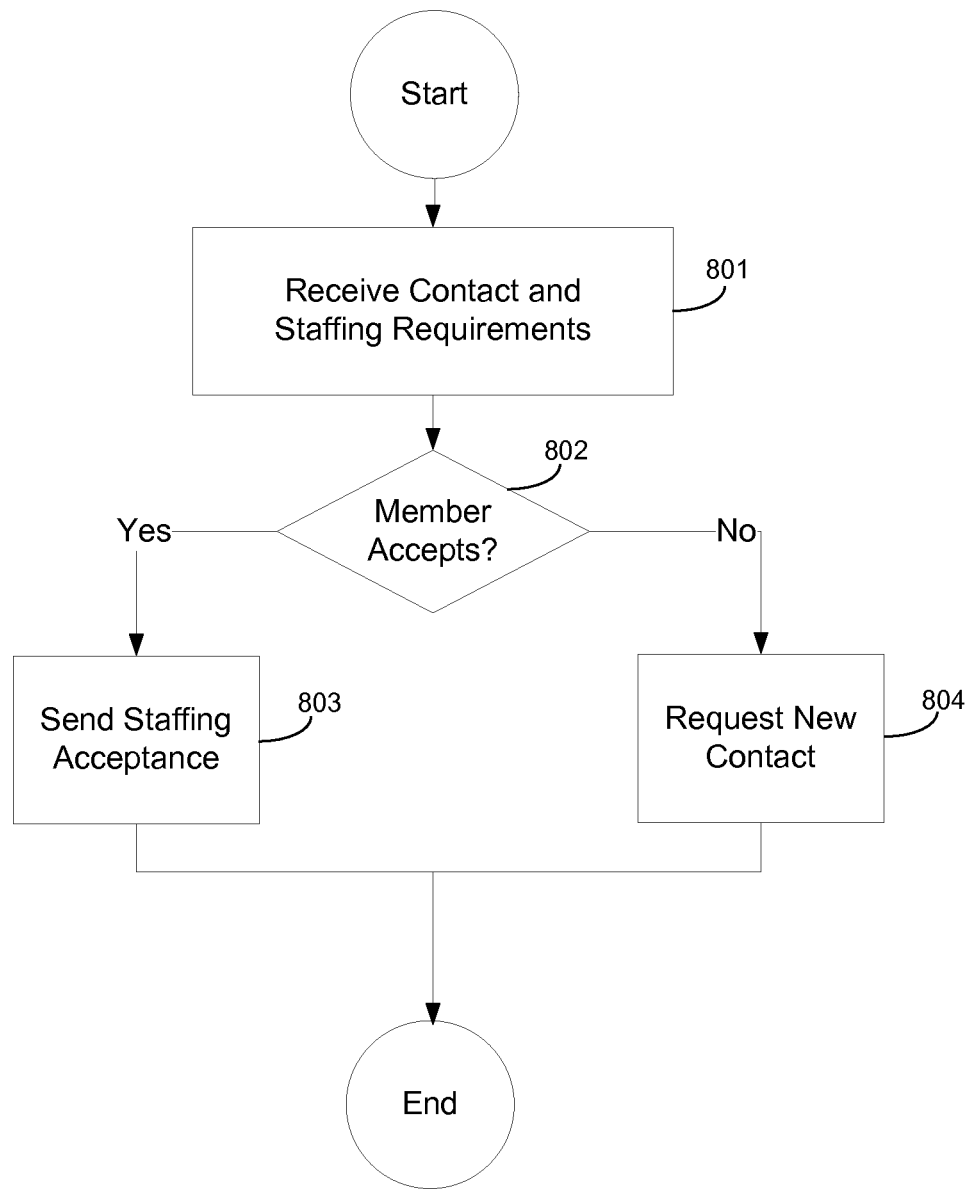
FIG. 8 is a flowchart illustrating an IVR module that can be used in accordance with alternative embodiments of the present invention.

FIG. 8 provides an alternative embodiment for the IVR module. For this particular embodiment, the IVR module is invoked once a contact has been established with a staff member. For example, in one embodiment, the dialer 150 first contacts a particular staff member with respect to fulfilling one or more shifts and/or staff member positions and sends the contact and associated information with respect to the shifts and/or staff member positions to the IVR 135. Thus, in Step 801, the IVR 135 receives the contact (e.g., the telephone call with the staff member) and the associated information with respect to the shifts and/or staff member positions. Depending on the embodiment, the associated information may be received directly from the dialer 150 or may be received from another component such as the schedule module 309.

At this point, the IVR module determines whether the staff member agrees to accept one or more staff member positions for one or more shifts, shown as Step 802. As previously described, depending on the embodiment, the IVR module may accomplish this task by asking questions and receiving answers by either the staff member selecting one or more keys and/or by speaking one or more words the IVR module recognizes If the staff member does not agree to fulfill one or more of the staff member positions, the IVR module requests another contact from the dialer 150, shown as Step 804. At this point, the IVR module ends and waits to be invoked again once a new contact has been made.

If the staff member does agree to fulfill one or more of the staff member positions, the IVR module sends the staffing acceptance to the dialer 150 and/or schedule module 309 in Step 803. At this point, either the schedule module 309 receives the acceptance directly or via the dialer 150 and continues with generating the schedule as previously described.

It is noted that although the above example involves the IVR module being invoked by a dialer 150, in other embodiments, the IVR module may be invoked by other components of the call center. For example, if the communications to the agents involve Web chats, then a Web server may be the component that invokes the IVR module as opposed to a dialer 150. Further, in particular embodiments, the IVR module may be invoked by a number of different components depending on the type of communication being used to contact the staff members.

Exemplary Processing Device Architecture

Figure 9:
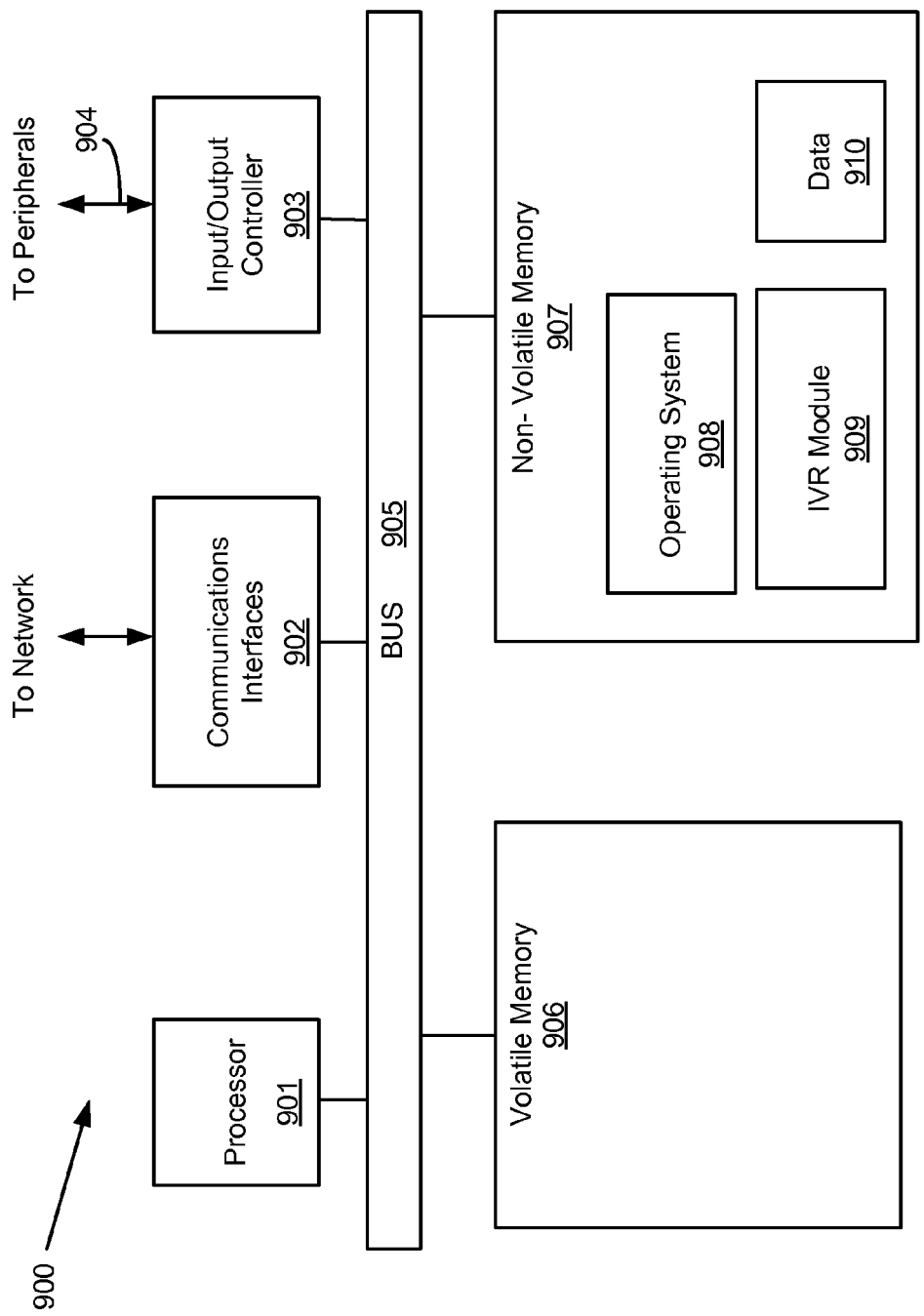
FIG. 9 is an exemplary schematic diagram of a system used in one embodiment of the call center architecture to practice the technologies disclosed herein.

As discussed in conjunction with FIG. 1, the call center architecture 100 may comprise various components that comprise a processing system. FIG. 9 is an exemplary schematic diagram of a processing system 900 that may be used in an embodiment of the call center architecture 100 to practice the technologies disclosed herein such as, for example, the ACD 130, IVR 135, CRM server 140, CTI server 145, dialer 150, WFM 155, or other component previously described. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 9, the processing system 900 may include one or more processors 901 that may communicate with other elements within the processing system 900 via a bus 905. The processor 901 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 900 may also include one or more communications interfaces 902 for communicating data via the local network with various external devices, such as other components of FIG. 1. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 903 may also communicate with one or more input devices or peripherals using an interface 904, such as, but not limited to: a keyboard, a mouse, a touch screen/display input, microphone, pointing device, etc. The input/output controller 903 may also communicate with output devices or peripherals, such as displays, printers, speakers, headsets, banner displays, etc.

The processor 901 may be configured to execute instructions stored in volatile memory 906, non-volatile memory 907, or other forms of computer-readable storage media accessible to the processor 901. The volatile memory 906 may comprise various types of memory technologies, including, but not limited to: random access memory ("RAM"), dynamic random access memory ("DRAM"), static random access memory ("SRAM"), and other forms well known to those skilled in the art. The non-volatile memory 907 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 907 may store program code and data, which also may be loaded into the volatile memory 906 at execution time. Specifically, the non-volatile memory 907 may store one or more computer program modules, such as an IVR module 909, and/or operating system code 908 containing instructions for performing the process and/or functions associated with the technologies disclosed herein. In addition, the IVR module 909 may comprise further modules. The IVR module 909 may also access, generate, or store data 910 in the non-volatile memory 907, as well as in the volatile memory 906. The volatile memory 906 and/or non-volatile memory 907 may be used to store other information including, but not limited to: records, applications, programs, scripts, source code, object code, byte code, compiled code, interpreted code, machine code, executable instructions, or the like. These may be executed or processed by, for example, the processor 901. These may form a part of, or may interact with, the IVR module 909.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for fulfilling a staff member position using an interactive voice response system (IVR), the method comprising the steps of:
    identifying the staff member position to be fulfilled using the IVR;
    contacting an eligible staff member that may fulfill the staff member position;
    upon contacting the eligible staff member, requesting the eligible staff member using the IVR to fulfill the staff member position;
    receiving a response from the eligible staff member at the IVR indicating whether the eligible staff member accepts or denies fulfilling the staff member position;
    upon the response indicating the eligible staff member accepts fulfilling the staff member position, sending an acceptance from the IVR to at least one computer processor; and
    upon receiving the acceptance, scheduling the eligible staff member to fulfill the staff member position by the at least one computer processor.

2. The method of claim 1, wherein the step of contacting the eligible staff member comprises the sub-steps of:
    identifying contact information for eligible staff member, the contact information comprising a plurality of contact sources;
    attempting to contact the eligible staff member based on a first contact source from the plurality of contact sources; and
    upon failure to contact the eligible staff member based on the first contact source, contacting the eligible staff member based on a second contact source from the plurality of contact sources.

3. The method of claim 1 comprising the steps of, upon the response indicating the eligible staff member denies fulfilling the staff member position:
    contacting a second eligible staff member that may fulfill the staff member position;
    upon contacting the second eligible staff member, requesting the second eligible staff member using the IVR to fulfill the staff member position;
    receiving a second response from the second eligible staff member at the IVR indicating whether the second eligible staff member accepts or denies fulfilling the staff member position;
    upon the second response indicating the second eligible staff member accepts fulfilling the staff member position, sending a second acceptance from the IVR to the at least one computer processor; and
    upon receiving the second acceptance, scheduling the second eligible staff member to fulfill the staff member position by the at least one computer processor.

4. The method of claim 3 comprising the step of setting a priority order for each member of a plurality of eligible staff members to establish an order in which the eligible staff members are to be contacted to fulfill the staff member position, wherein the second eligible staff member is a member positioned after the eligible staff member based on the priority order.

5. The method of claim 1, wherein the staff member position comprises a position needed to be staffed by a contact center and the eligible staff member comprises an agent employed by the contact center.

6. The method of claim 5, wherein the staff member position needed to be staffed by the contact center is for an outbound call campaign, and the method comprises the steps of:
    defining campaign parameters for the outbound call campaign, the campaign parameters for the outbound call campaign comprising: (1) a time period over which the outbound call campaign is to be carried out and (2) a target value identifying a number of an outbound communication result to occur over the time period;
    selecting a historical dataset comprising historical data on the corresponding outbound communication result for the outbound call campaign based on past outbound communications handled over a historical time period; and forecasting the staff member position needed to be staffed by the contact center by generating an outbound forecast by the at least one computer processor, the outbound forecast based on the historical dataset and the campaign parameters for the outbound call campaign, and the outbound forecast comprising a number of the outbound communication result forecasted to be achieved over the time period for the outbound call campaign in an attempt to meet the target value for the outbound call campaign.

7. A non-transitory, computer-readable medium comprising computer-executable instructions for fulfilling a staff member position using an interactive voice response system (IVR), the computer executable instructions when executed by at least one computer processor are configured to cause the at least one computer processor to:
identify the staff member position to be fulfilled using the IVR;
identify an eligible staff member that may fulfill the staff member position;
upon receiving an acceptance from the IVR indicating the eligible staff member accepts fulfilling the staff member position, schedule the eligible staff member to fulfill the staff member position, wherein the IVR is configured to:
upon contacting the eligible staff member, request the eligible staff member to fulfill the staff member position;
receive a response from the eligible staff member indicating whether the eligible staff member accepts or denies fulfilling the staff member position; and
upon the response indicating the eligible staff member accepts fulfilling the staff member position, send the acceptance indicating the eligible staff member accepts fulfilling the staff member position.

8. The non-transitory, computer-readable medium of claim 7, wherein the computer-executable instructions when executed by the at least one computer processor are configured to cause the at least one computer processor to:
identify contact information for the eligible staff member, the contact information comprising a plurality of contact sources; and
provide the contact information to the IVR, wherein the IVR is configured to:
attempt to contact the eligible staff member based on a first contact source from the plurality of contact sources; and
upon failure to contact the eligible staff member based on the first contact source, contact the eligible staff member based on a second contact source from the plurality of contact sources.

9. The non-transitory, computer-readable medium of claim 7, wherein the computer-executable instructions when executed by the at least one computer processor are configured to cause the at least one computer processor, upon the response indicating the eligible staff member denies fulfilling the staff member position, to:
identify a second eligible staff member to fulfill the staff member position; and
upon receiving a second acceptance from the IVR indicating the second eligible staff member accepts fulfilling the staff member position, schedule the second eligible staff member to fulfill the staff member position, wherein the IVR is configured to:
upon contacting the second eligible staff member, request the second eligible staff member to fulfill the staff member position;
receive a second response from the second eligible staff member indicating whether the second eligible staff member accepts or denies fulfilling the staff member position; and
upon the response indicating the second eligible staff member accepts fulfilling the staff member position, send the second acceptance indicating the second eligible staff member accepts fulfilling the staff member position.

10. The non-transitory, computer-readable medium of claim 7, wherein the computer-executable instructions when executed by the at least one computer processor are configured to cause the at least one computer processor to set a priority order for each member of a plurality of eligible staff members to establish an order in which the eligible staff members are to be contacted to fulfill the staff member position.

11. The non-transitory, computer-readable medium of claim 7, wherein the staff member position comprises a position needed to be staffed by a contact center and the eligible staff member comprises an agent employed by the contact center.

12. The non-transitory, computer-readable medium of claim 11, wherein the staff member position needed to be staffed by the contact center is for an outbound call campaign and campaign parameters are defined for the outbound call campaign comprising: (1) a time period over which the outbound call campaign is to be carried out and (2) a target value identifying a number of an outbound communication result to occur over the time period, and the computer-executable instructions when executed by the at least one computer processor are configured to cause the at least one computer processor to:
select a historical dataset comprising historical data on the corresponding outbound communication result for the outbound call campaign based on past outbound communications handled over a historical time period; and
forecast the staff member position needed to be staffed by the contact center by generating an outbound forecast based on the historical dataset and the campaign parameters for the outbound call campaign, the outbound forecast comprising a number of the outbound communication result forecasted to be achieved over the time period for the outbound call campaign in an attempt to meet the target value for the outbound call campaign.

13. A system for fulfilling a staff member position, the system comprising:
at least one computer processor; and
an interactive voice response system (IVR), wherein:
the at least one computer processor is configured to:
identify the staff member position that requires fulfillment using the IVR;
identify an eligible staff member that may fulfill the staff member position; and
the IVR is configured to:
upon contacting the eligible staff member, request the eligible staff member to fulfill the staff member position;
receive a response from the eligible staff member indicating whether the eligible staff member accepts or denies fulfilling the staff member position; and
upon the response indicating the eligible staff member accepts fulfilling the staff member position, send an acceptance to the at least one computer processor, wherein the at least one computer processor is configured, upon receiving the acceptance indicating the eligible staff member accepts fulfilling the staff member position, to schedule the eligible staff member to fulfill the staff member position.

14. The system of claim 13 further comprising a dialer, wherein:
the at least one computer processor is configured to:
identify contact information for the eligible staff member, the contact information comprising a plurality of contact sources; and
provide the contact information to the IVR; and
the dialer is configured to:
attempt to contact the eligible staff members based on a first contact source from the plurality of contact sources; and
upon failure to contact the eligible staff member based on the first contact source, contact the eligible staff member based on a second contact source from the plurality of contact sources.

15. The system of claim 13, wherein, upon the response indicating the eligible staff member denies fulfilling the staff member position, the IVR is configured to:
upon contacting a second eligible staff member, request the second eligible staff member to fulfill the staff member position;
receive a second response from the second eligible staff member indicating whether the second eligible staff member accepts or denies fulfilling the staff member position; and
upon the second response indicating the second eligible staff member accepts fulfilling the staff member position, send a second acceptance to the at least one computer processor; and
the at least one computer processor is configured to, upon receiving the second acceptance indicating the second eligible staff member accepts fulfilling the staff member position from the IVR, schedule the second eligible staff member to fulfill the staff member position.

16. The system of claim 13, wherein the at least one computer processor is configured to set a priority order for each member of a plurality of eligible staff members to establish an order in which the eligible staff members are to be contacted to fulfill the staff member position, and the second eligible staff member is a member positioned after the eligible staff member based on the priority order.

17. The system of claim 13, wherein the staff member position comprises a position needed to be staffed by a contact center and the eligible staff member comprises an agent employed by the contact center.

18. The system of claim 15, wherein the staff member position needed to be staffed by the contact center is for an outbound call campaign and campaign parameters are defined for the outbound call campaign comprising: (1) a time period over which the outbound call campaign is to be carried out and (2) a target value identifying a number of an outbound communication result to occur over the time period, and the at least one computer processor is configured to:
select a historical dataset comprising historical data on the corresponding outbound communication result for the outbound call campaign based on past outbound communications handled over a historical time period; and
forecast the staff member position needed to be staffed by the contact center by generating an outbound forecast based on the historical dataset and the campaign parameters for the outbound call campaign, the outbound forecast comprising a number of the outbound communication result forecasted to be achieved over the time period for the outbound call campaign in an attempt to meet the target value for the outbound call campaign.

* * * * *